United States Patent
Gronvall et al.

(10) Patent No.: US 7,609,925 B2
(45) Date of Patent: Oct. 27, 2009

(54) FIBER OPTIC CABLE BREAKOUT CONFIGURATION WITH TENSILE REINFORCEMENT

(75) Inventors: Erik Gronvall, Richfield, MN (US);
Paul Suek, Eden Prairie, MN (US);
Andy Schmidt, Northfield, MN (US);
Yu Lu, Westborough, MA (US); Scott Carlson, Bloomington, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/787,218

(22) Filed: Apr. 12, 2007

(65) Prior Publication Data
US 2008/0253729 A1 Oct. 16, 2008

(51) Int. Cl.
*G02B 6/255* (2006.01)
(52) U.S. Cl. .................. 385/100; 385/113; 385/106
(58) Field of Classification Search .................. 385/100, 385/113, 106
See application file for complete search history.

(56) References Cited

U.S. PATENT DOCUMENTS

| | | | |
|---|---|---|---|
| 2,047,152 A | 7/1936 | Mitchell | |
| 3,076,737 A | 2/1963 | Roberts | |
| 3,691,505 A | 9/1972 | Graves | |
| 3,750,058 A | 7/1973 | Bankert, Jr. et al. | |
| 3,845,552 A | 11/1974 | Waltz | |
| 3,879,575 A | 4/1975 | Dobbin et al. | |
| 3,912,854 A | 10/1975 | Thompson et al. | |
| 3,912,855 A | 10/1975 | Thompson et al. | |
| 4,085,286 A | 4/1978 | Horsma et al. | |

(Continued)

FOREIGN PATENT DOCUMENTS

CA 2103832 2/1994

(Continued)

OTHER PUBLICATIONS

"Cable Assemblies: Molding & Termination," http://www.dgo.com/prodcable.htm, 8 pages (Copyright 2001).

(Continued)

*Primary Examiner*—K. Cyrus Kianni
(74) *Attorney, Agent, or Firm*—Merchant & Gould P.C.

(57) ABSTRACT

The present disclosure relates to a fiber optic telecommunications cable assembly including a main fiber optic cable and a tether cable that branches from the main fiber optic cable at a breakout location. The breakout location includes a breakout block mounted to the main fiber optic cable, a tether retention block mounted to the main fiber optic cable, and a sleeve positioned outside the main fiber optic cable that extends from the breakout block to the tether retention block. An optical fiber structure extends from the main fiber optic cable, through the breakout block, through the sleeve and through the tether retention block to the tether cable. The fiber optic telecommunications cable assembly also includes a tensile reinforcing structure that extends from the breakout block to the retention block for preventing a spacing between the breakout block and the retention block from exceeding a predetermined amount. The tensile reinforcing structure is positioned outside the main fiber optic cable and has portions anchored to the breakout block and the retention block. The fiber optic telecommunications cable assembly further includes an over-mold that covers the breakout block, the sleeve, the retention block, the tensile reinforcing structure and at least a portion of the main fiber optic cable.

25 Claims, 36 Drawing Sheets

U.S. PATENT DOCUMENTS

| | | | |
|---|---|---|---|
| 4,107,451 A | 8/1978 | Smith, Jr. et al. | |
| 4,146,302 A | 3/1979 | Jachimowicz | |
| 4,152,539 A | 5/1979 | Charlebois et al. | |
| 4,322,573 A | 3/1982 | Charlebois | |
| 4,343,844 A | 8/1982 | Thayer et al. | |
| 4,405,083 A | 9/1983 | Charlebois et al. | |
| 4,413,881 A | 11/1983 | Kovats | |
| 4,467,137 A | 8/1984 | Paget et al. | |
| 4,475,935 A | 10/1984 | Tanaka et al. | |
| 4,481,380 A | 11/1984 | Wood et al. | |
| 4,490,315 A | 12/1984 | Charlebois et al. | |
| 4,512,628 A | 4/1985 | Anderton | |
| 4,528,150 A | 7/1985 | Charlebois et al. | |
| 4,528,419 A | 7/1985 | Charlebois et al. | |
| 4,549,039 A | 10/1985 | Charlebois et al. | |
| 4,550,220 A | 10/1985 | Kitchens | |
| 4,556,281 A | 12/1985 | Anderton | |
| 4,570,032 A | 2/1986 | Charlebois et al. | |
| 4,581,480 A | 4/1986 | Charlebois | |
| 4,589,939 A | 5/1986 | Mohebban et al. | |
| 4,591,330 A | 5/1986 | Charlebois et al. | |
| 4,592,721 A | 6/1986 | Charlebois et al. | |
| 4,595,256 A | 6/1986 | Guazzo | |
| 4,609,773 A | 9/1986 | Brown et al. | |
| 4,625,073 A | 11/1986 | Breesch et al. | |
| 4,629,597 A | 12/1986 | Charlebois et al. | |
| 4,648,606 A | 3/1987 | Brown et al. | |
| 4,648,919 A | 3/1987 | Diaz et al. | |
| 4,654,474 A | 3/1987 | Charlebois et al. | |
| 4,666,537 A | 5/1987 | Dienes | |
| 4,670,069 A | 6/1987 | Debbaut et al. | |
| 4,670,980 A | 6/1987 | Charlebois et al. | |
| 4,678,866 A | 7/1987 | Charlebois | |
| 4,684,764 A | 8/1987 | Luzzi et al. | |
| 4,691,081 A | 9/1987 | Gupta et al. | |
| 4,701,574 A | 10/1987 | Shimirak et al. | |
| 4,725,035 A | 2/1988 | Charlebois et al. | |
| 4,732,628 A | 3/1988 | Dienes | |
| 4,747,020 A | 5/1988 | Brickley et al. | |
| 4,759,602 A | 7/1988 | Pascher | |
| 4,761,052 A | 8/1988 | Buekers et al. | |
| 4,764,232 A | 8/1988 | Hunter | |
| 4,818,824 A | 4/1989 | Dixit et al. | |
| 4,822,134 A | 4/1989 | Campbell | |
| 4,822,434 A | 4/1989 | Sawaki et al. | |
| 4,826,277 A | 5/1989 | Weber et al. | |
| 4,875,952 A | 10/1989 | Mullin et al. | |
| 4,884,863 A | 12/1989 | Throckmorton | |
| 4,913,512 A | 4/1990 | Anderton | |
| 4,961,623 A | 10/1990 | Midkiff et al. | |
| 4,963,698 A | 10/1990 | Chang et al. | |
| 4,983,013 A | 1/1991 | Dotzer et al. | |
| 4,983,333 A | 1/1991 | Blew | |
| 4,985,185 A | 1/1991 | Mayr et al. | |
| 5,004,315 A | 4/1991 | Miyazaki | |
| 5,018,825 A | 5/1991 | Rowland | |
| 5,042,901 A | 8/1991 | Merriken et al. | |
| 5,046,811 A | 9/1991 | Jung et al. | |
| 5,054,868 A | 10/1991 | Hoban et al. | |
| 5,066,095 A | 11/1991 | Dekeyser et al. | |
| 5,074,808 A | 12/1991 | Beamenderfer et al. | |
| 5,097,529 A | 3/1992 | Cobb et al. | |
| 5,099,088 A | 3/1992 | Usami et al. | |
| 5,115,105 A | 5/1992 | Gallusser et al. | |
| 5,121,458 A | 6/1992 | Nilsson et al. | |
| 5,125,060 A | 6/1992 | Edmundson | |
| 5,163,116 A | 11/1992 | Oestreich et al. | |
| 5,185,844 A | 2/1993 | Bensel, III et al. | |
| 5,194,692 A | 3/1993 | Gallusser et al. | |
| 5,210,812 A * | 5/1993 | Nilsson et al. | 385/100 |
| 5,217,808 A | 6/1993 | Cobb | |
| 5,241,611 A | 8/1993 | Gould | |
| 5,245,151 A | 9/1993 | Chamberlain et al. | |
| 5,283,014 A | 2/1994 | Oestreich et al. | |
| 5,335,408 A | 8/1994 | Cobb | |
| 5,347,089 A | 9/1994 | Barrat et al. | |
| 5,353,367 A | 10/1994 | Czosnowski et al. | |
| 5,371,824 A | 12/1994 | Parris et al. | |
| 5,376,196 A | 12/1994 | Grajewski et al. | |
| 5,378,853 A | 1/1995 | Clouet et al. | |
| 5,394,502 A | 2/1995 | Caron | |
| 5,402,515 A | 3/1995 | Vidacovich et al. | |
| 5,410,105 A | 4/1995 | Tahara et al. | |
| RE34,955 E | 5/1995 | Anton et al. | |
| 5,420,958 A | 5/1995 | Henson et al. | |
| 5,440,665 A * | 8/1995 | Ray et al. | 385/135 |
| 5,442,726 A | 8/1995 | Howard et al. | |
| 5,450,517 A | 9/1995 | Essert | |
| 5,456,959 A | 10/1995 | Dawes | |
| 5,491,766 A | 2/1996 | Huynh et al. | |
| 5,509,202 A | 4/1996 | Abdow | |
| 5,517,592 A | 5/1996 | Grajewski et al. | |
| 5,528,718 A * | 6/1996 | Ray et al. | 385/136 |
| 5,608,832 A | 3/1997 | Pfandl et al. | |
| 5,657,413 A | 8/1997 | Ray et al. | |
| 5,666,453 A | 9/1997 | Dannenmann | |
| 5,684,911 A | 11/1997 | Burgett | |
| 5,696,864 A | 12/1997 | Smith et al. | |
| 5,734,776 A | 3/1998 | Puetz | |
| 5,761,361 A | 6/1998 | Pfandl et al. | |
| 5,767,448 A | 6/1998 | Dong | |
| 5,778,122 A | 7/1998 | Giebel et al. | |
| 5,815,908 A | 10/1998 | Wichmann | |
| 5,823,646 A | 10/1998 | Arizpe et al. | |
| 5,825,963 A | 10/1998 | Burgett | |
| 5,861,575 A | 1/1999 | Broussard | |
| 5,892,870 A | 4/1999 | Fingler et al. | |
| 5,945,633 A | 8/1999 | Ott et al. | |
| 5,969,294 A | 10/1999 | Eberle et al. | |
| 5,997,186 A * | 12/1999 | Huynh et al. | 385/99 |
| RE36,592 E | 2/2000 | Giebel et al. | |
| 6,034,002 A | 3/2000 | Maderek | |
| 6,104,846 A | 8/2000 | Hodgson et al. | |
| RE37,028 E | 1/2001 | Cooke et al. | |
| 6,181,861 B1 | 1/2001 | Wenski et al. | |
| 6,215,930 B1 | 4/2001 | Estes et al. | |
| 6,246,821 B1 | 6/2001 | Hemken et al. | |
| 6,255,584 B1 | 7/2001 | Renaud | |
| 6,311,000 B1 | 10/2001 | Schneider | |
| 6,376,774 B1 | 4/2002 | Oh et al. | |
| 6,407,338 B1 | 6/2002 | Smith | |
| 6,466,725 B2 | 10/2002 | Battey et al. | |
| 6,493,500 B1 | 12/2002 | Oh et al. | |
| 6,539,160 B2 | 3/2003 | Battey et al. | |
| 6,579,014 B2 | 6/2003 | Melton et al. | |
| 6,619,697 B2 | 9/2003 | Griffioen et al. | |
| 6,621,975 B2 | 9/2003 | Laporte et al. | |
| 6,648,520 B2 | 11/2003 | McDonald et al. | |
| 6,655,016 B2 | 12/2003 | Renaud | |
| 6,668,127 B1 | 12/2003 | Mahony | |
| 6,706,968 B2 | 3/2004 | Yaworski et al. | |
| 6,764,220 B2 | 7/2004 | Griffiths et al. | |
| 6,810,194 B2 | 10/2004 | Griffiths et al. | |
| 6,819,842 B1 | 11/2004 | Vogel et al. | |
| 6,856,748 B1 | 2/2005 | Elkins, II et al. | |
| 6,866,430 B1 | 3/2005 | Faiss et al. | |
| 6,880,219 B2 | 4/2005 | Griffioen et al. | |
| 7,006,739 B2 | 2/2006 | Elkins, II et al. | |
| 7,016,592 B2 | 3/2006 | Elkins, II et al. | |
| 7,088,893 B2 | 8/2006 | Cooke et al. | |
| 7,090,407 B2 | 8/2006 | Melton et al. | |
| 7,113,679 B2 | 9/2006 | Melton et al. | |
| 7,127,143 B2 | 10/2006 | Elkins, II et al. | |
| 7,136,555 B2 | 11/2006 | Theuerkorn et al. | |

| | | |
|---|---|---|
| 7,155,093 B2 | 12/2006 | Elkins, II et al. |
| 7,184,633 B2 | 2/2007 | Cooke et al. |
| 7,197,214 B2 | 3/2007 | Elkins, II et al. |
| 7,242,841 B2 | 7/2007 | Greenwood et al. |
| 7,251,411 B1 | 7/2007 | Lu et al. |
| 7,266,274 B2 | 9/2007 | Elkins, II et al. |
| 7,272,282 B1 * | 9/2007 | Seddon et al. ............... 385/106 |
| 7,272,283 B2 * | 9/2007 | Temple et al. ................ 385/114 |
| 7,277,614 B2 | 10/2007 | Cody et al. |
| 7,289,714 B1 | 10/2007 | Wells |
| 7,317,863 B2 | 1/2008 | Lu et al. |
| 7,330,621 B2 * | 2/2008 | Elkins et al. ................. 385/100 |
| 7,333,708 B2 | 2/2008 | Blackwell, Jr. et al. |
| 7,349,605 B2 | 3/2008 | Noonan et al. |
| 7,403,685 B2 * | 7/2008 | Wells .......................... 385/100 |
| 7,422,378 B2 | 9/2008 | Lu et al. |
| 7,424,189 B2 | 9/2008 | Lu et al. |
| 2002/0064364 A1 | 5/2002 | Battey et al. |
| 2003/0118295 A1 | 6/2003 | Lail et al. |
| 2003/0223219 A1 | 12/2003 | Ladyjensky |
| 2004/0016564 A1 | 1/2004 | Lambert, Jr. |
| 2004/0074852 A1 | 4/2004 | Knudsen et al. |
| 2004/0223699 A1 * | 11/2004 | Melton et al. .................. 385/53 |
| 2004/0228589 A1 | 11/2004 | Melton et al. |
| 2004/0247265 A1 | 12/2004 | Takano et al. |
| 2005/0002621 A1 | 1/2005 | Zimmel et al. |
| 2005/0053342 A1 * | 3/2005 | Melton et al. ................ 385/113 |
| 2005/0069275 A1 | 3/2005 | Brants et al. |
| 2005/0111799 A1 | 5/2005 | Cooke et al. |
| 2005/0111800 A1 * | 5/2005 | Cooke et al. ................. 385/100 |
| 2005/0129375 A1 | 6/2005 | Elkins, II et al. |
| 2005/0175308 A1 | 8/2005 | Elkins, II et al. |
| 2005/0180705 A1 | 8/2005 | Elkins, II et al. |
| 2005/0259928 A1 | 11/2005 | Elkins, II et al. |
| 2005/0259929 A1 | 11/2005 | Elkins, II et al. |
| 2005/0259930 A1 | 11/2005 | Elkins, II et al. |
| 2005/0265672 A1 * | 12/2005 | Theuerkorn et al. ......... 385/100 |
| 2005/0276552 A1 | 12/2005 | Cooke et al. |
| 2006/0056782 A1 | 3/2006 | Elkins, II et al. |
| 2006/0115220 A1 | 6/2006 | Elkins, II et al. |
| 2006/0120672 A1 | 6/2006 | Cody et al. |
| 2006/0153517 A1 * | 7/2006 | Reagan et al. ............... 385/135 |
| 2006/0193573 A1 | 8/2006 | Greenwood et al. |
| 2006/0193594 A1 * | 8/2006 | Greenwood et al. ......... 385/147 |
| 2006/0233509 A1 | 10/2006 | Ray et al. |
| 2007/0025668 A1 * | 2/2007 | Greenwood et al. ......... 385/103 |
| 2007/0098339 A1 * | 5/2007 | Bringuier et al. ............ 385/106 |
| 2007/0104446 A1 * | 5/2007 | Lu et al. ...................... 385/135 |
| 2007/0212004 A1 | 9/2007 | Lu et al. |
| 2007/0212005 A1 * | 9/2007 | Lu et al. ...................... 385/100 |
| 2007/0212009 A1 * | 9/2007 | Lu et al. ...................... 385/135 |
| 2007/0237484 A1 | 10/2007 | Reagan et al. |
| 2007/0263965 A1 * | 11/2007 | Cody et al. .................. 385/100 |
| 2008/0013898 A1 * | 1/2008 | Wells ............................ 385/96 |
| 2008/0080818 A1 | 4/2008 | Cobb, III et al. |
| 2008/0085091 A1 | 4/2008 | Wells et al. |
| 2008/0089652 A1 * | 4/2008 | Wells .......................... 385/100 |
| 2008/0175541 A1 * | 7/2008 | Lu et al. ........................ 385/62 |
| 2008/0175542 A1 * | 7/2008 | Lu et al. ........................ 385/62 |
| 2008/0253722 A1 * | 10/2008 | Gronvall et al. ............. 385/103 |
| 2008/0253729 A1 * | 10/2008 | Gronvall et al. ............. 385/137 |

FOREIGN PATENT DOCUMENTS

| | | |
|---|---|---|
| DE | 31 08 381 A1 | 9/1982 |
| DE | 35 37 684 A1 | 4/1987 |
| DE | 39 01 610 C1 | 2/1990 |
| DE | 39 02 411 A1 | 8/1990 |
| DE | 42 14 377 A1 | 11/1993 |
| DE | 43 14 520 C1 | 7/1994 |
| DE | 43 41 999 A1 | 6/1995 |
| DE | 195 42 637 A1 | 5/1997 |
| EP | 0 115 725 A1 | 8/1984 |
| EP | 0 512 811 A1 | 11/1992 |
| EP | 1 052 533 A1 | 11/2000 |
| EP | 1 182 484 A2 | 2/2002 |
| EP | 1 361 465 A1 | 11/2003 |
| JP | 58-105114 | 6/1983 |
| JP | 60-169813 | 9/1985 |
| JP | 60-169815 | 9/1985 |
| JP | 61-27510 | 2/1986 |
| JP | 61-190305 | 8/1986 |
| JP | 61-220536 | 9/1986 |
| JP | 62-54204 | 3/1987 |
| JP | 62-59906 | 3/1987 |
| JP | 63-136007 | 6/1988 |
| JP | 63-180915 | 7/1988 |
| JP | 63-287916 | 11/1988 |
| JP | 63-310317 | 12/1988 |
| JP | 1-138828 | 5/1989 |
| JP | 2-278206 | 11/1990 |
| JP | 3-149507 | 6/1991 |
| JP | 8-43639 | 2/1996 |
| JP | 2001-51131 | 2/2001 |
| JP | 2001-116968 | 4/2001 |
| WO | WO 91/03854 | 3/1991 |
| WO | WO 94/24597 | 10/1994 |
| WO | WO 2005/119322 A1 | 12/2005 |
| WO | WO 2006/044080 A1 | 4/2006 |
| WO | WO 2006/060250 A2 | 6/2006 |
| WO | WO 2006/071412 A1 | 7/2006 |

OTHER PUBLICATIONS

"DAM/BLOK™ Electrical Splice Kit," http://www.pmiind.com/products/damblok.html, 2 pages (Copyright 2000).

"Factory Installed Termination Systems for Fiber Optic Cable Splices," 1 page (Publicly known at least as early as Jul. 21, 2006).

"Installation Instructions for Pre-Connectorized MIC® Cable (2-6 Fiber) Equipped with Plug & Play™ Systems Pulling Grips," Corning Cable Systems, Issue 7, pp. 1-3 (Jul. 2001).

"Pre-Connectorized (4-24 Fiber) Fiber Optic Cables Equipped with Plug & Play™ Systems Pulling Sleeves and Grips," Corning Cable Systems, Issue 1, pp. 1-7 (Mar. 2005).

International Search Report and Written Opinion mailed Aug. 8, 2008.

* cited by examiner

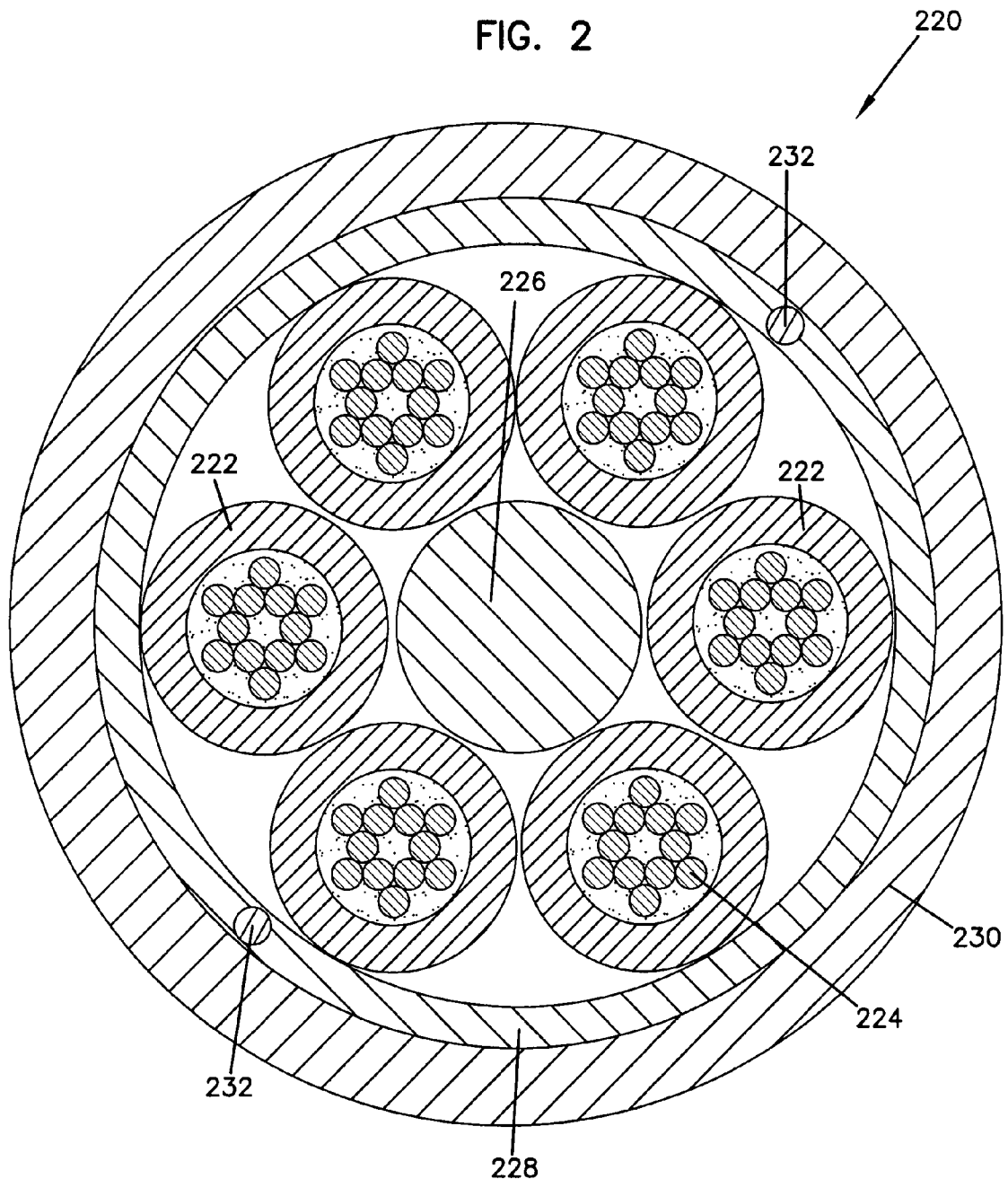

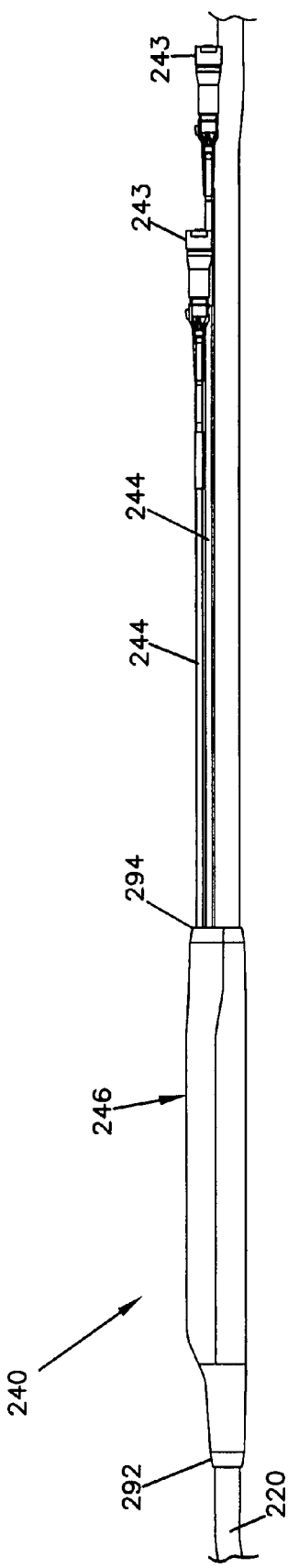

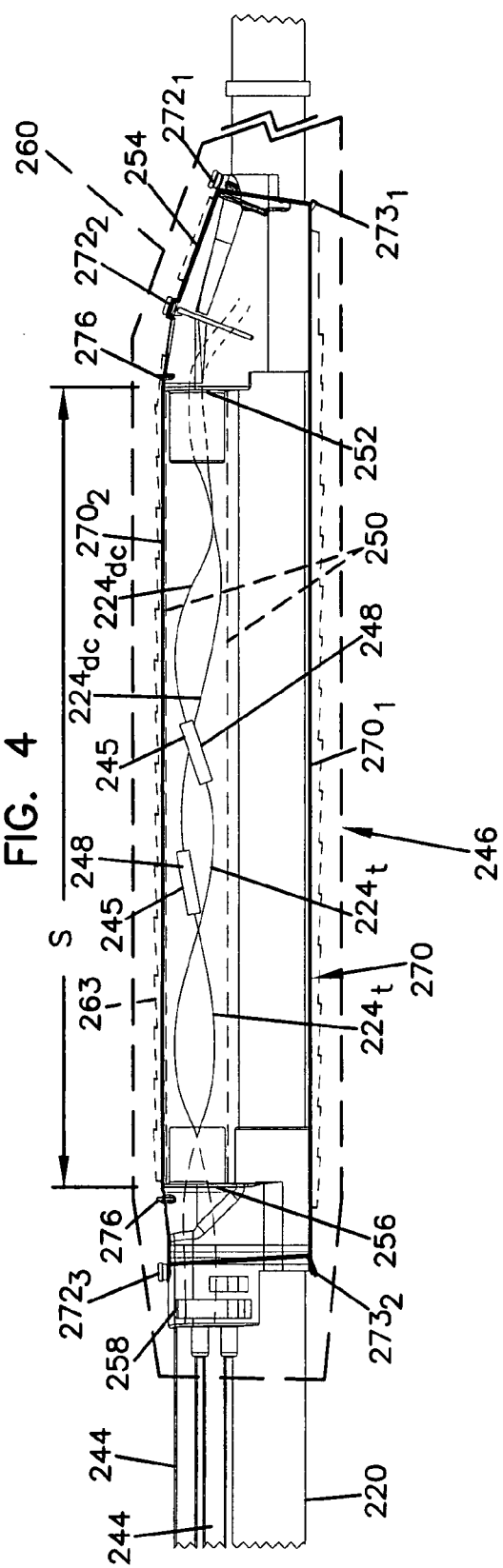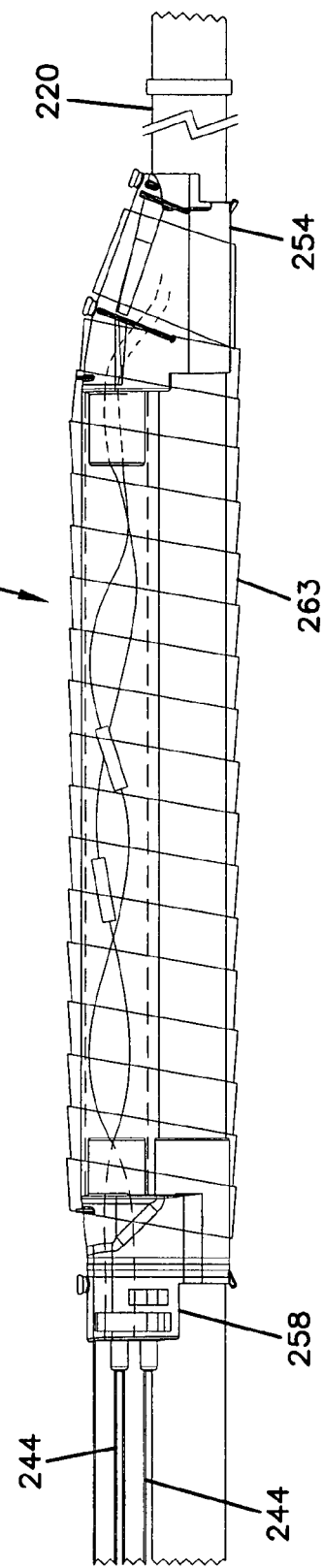

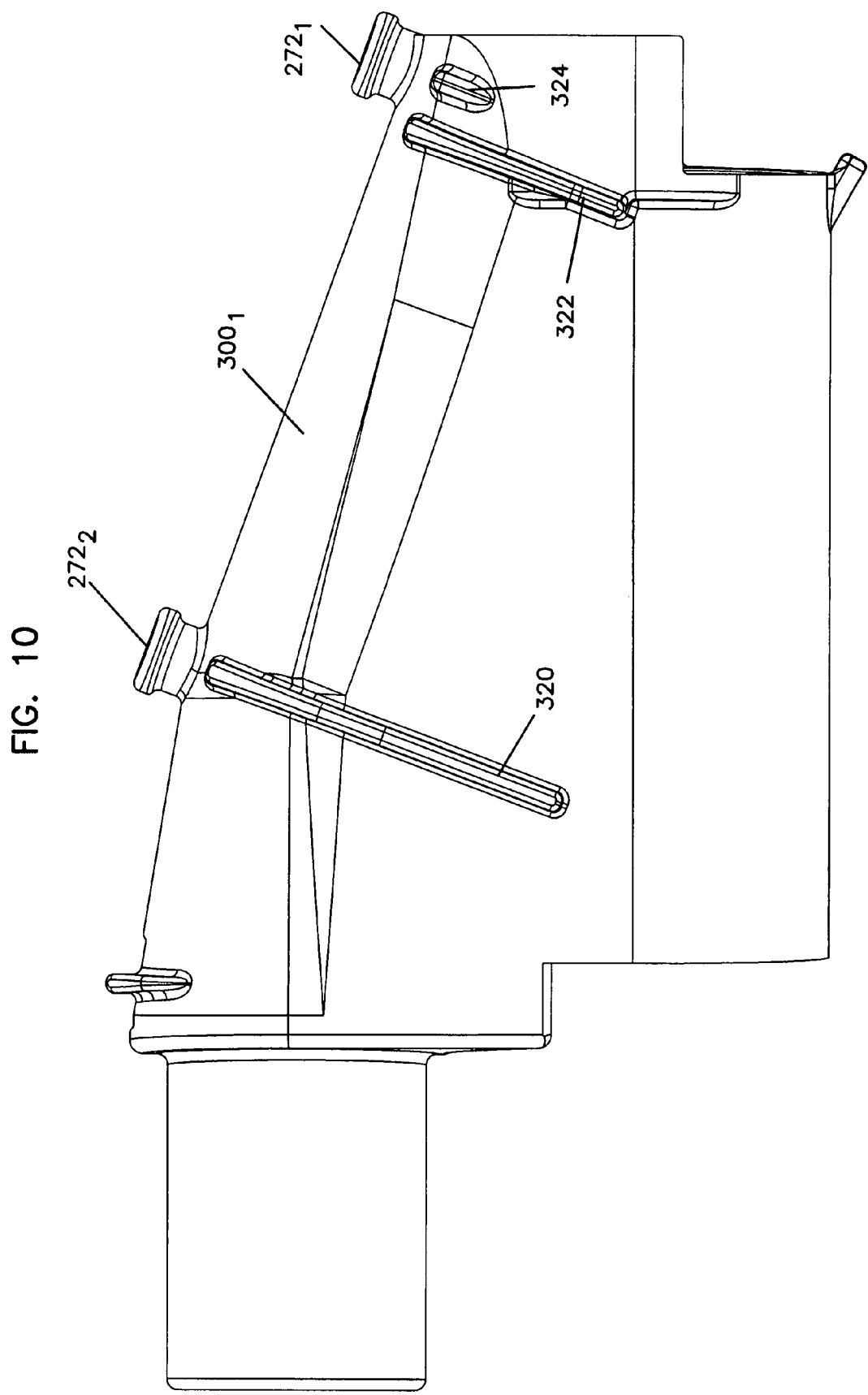

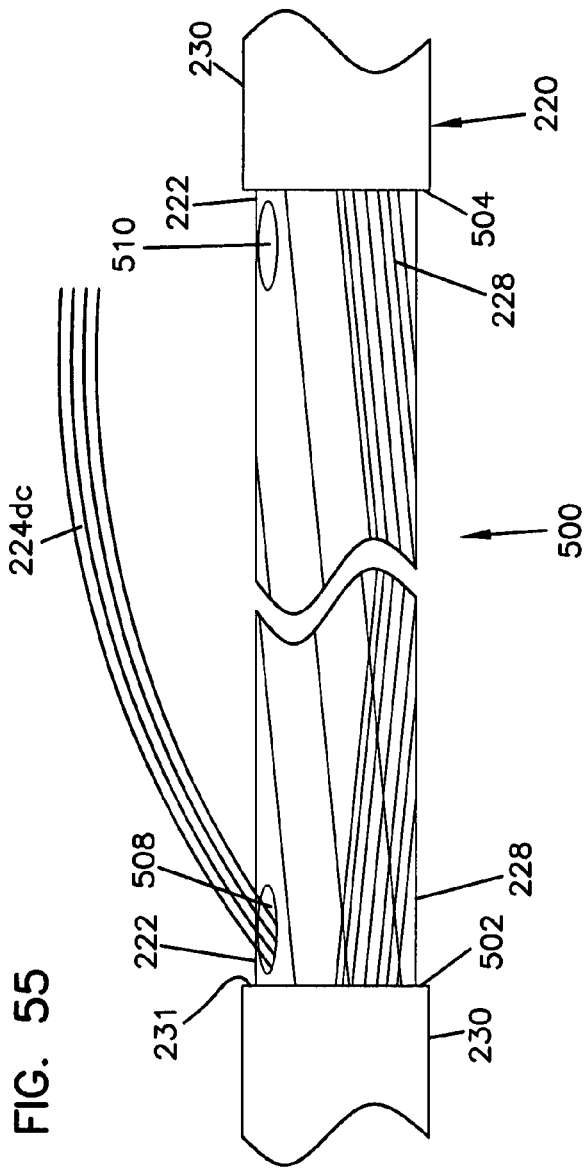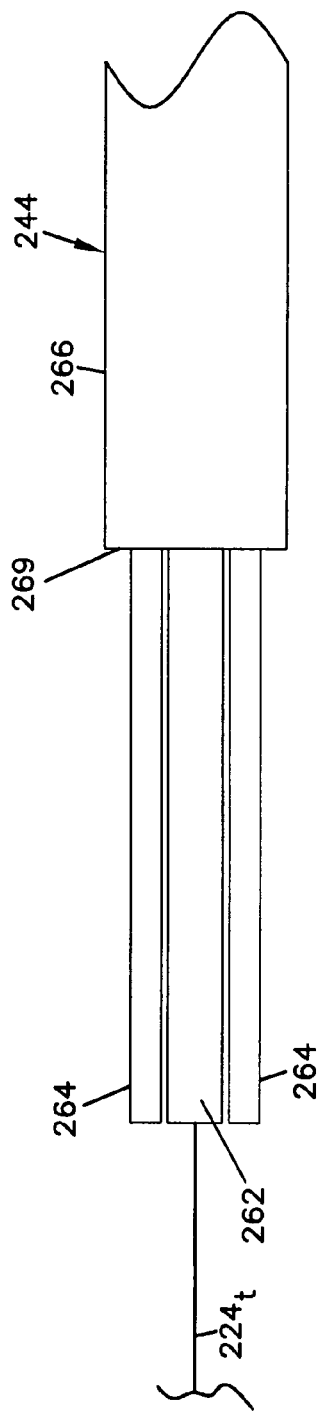

FIBER OPTIC CABLE BREAKOUT CONFIGURATION WITH TENSILE REINFORCEMENT

TECHNICAL FIELD

The principles disclosed herein relate to fiber optic cable systems. More particularly, the present disclosure relates to fiber optic cable systems having main cables and branch cables.

BACKGROUND

Optical networks are becoming prevalent in part because service providers want to deliver high bandwidth communication capabilities to customers. FIG. 1 illustrates a fiber optic network 100 deploying passive fiber optic lines. As shown in FIG. 1, the network 100 may include a central office 110 that connects a number of end subscribers 115 (also called end users 115 herein) in a network. The central office 110 may additionally connect to a larger network such as the Internet (not shown) and a public switched telephone network (PSTN). The network 100 may also include fiber distribution hubs (FDHs) 130 having one or more optical splitters (e.g., 1-to-8 splitters, 1-to-16 splitters, or 1-to-32 splitters) that generate a number of individual fibers that may lead to the premises of an end user 115. The various lines of the network can be aerial or housed within underground conduits (e.g., see conduit 105).

The portion of network 100 that is closest to central office 110 is generally referred to as the F1 region, where F1 is the "feeder fiber" or "feeder distribution cable" from the central office. The F1 portion of the network may include an F1 distribution cable having on the order of 12 to 48 feeder fibers; however, alternative implementations may include fewer or more fibers. The portion of network 100 near the end users 115 may be referred to as an F2 portion of network 100. Splitters used in an FDH 130 may accept fibers from an F1 distribution cable and may split those incoming fibers into, for example, 216 to 432 individual distribution fibers that may be associated with one or more F2 distribution cables. The F2 distribution cables are routed in fairly close proximity to the subscriber locations. Each fiber within the F2 distribution cable is adapted to correspond to a separate end user location.

Referring to FIG. 1, the network 100 includes a plurality of breakout locations 125 at which branch cables (e.g., drop cables, stub cables, etc.) are separated out from main cables (e.g., distribution cables). Breakout locations can also be referred to as tap locations or branch locations and branch cables can also be referred to as breakout cables. At a breakout location, fibers of the branch cables are typically spliced to selected fibers of the main cable. However, for certain applications, the interface between the fibers of the main cable and the fibers of the branch cables can be connectorized.

Stub cables are typically branch cables that are routed from breakout locations to intermediate access locations 104 such as a pedestals, drop terminals or hubs. Intermediate access locations 104 can provide connector interfaces located between breakout locations and subscriber locations. A drop cable is a cable that typically forms the last leg to a subscriber location 115. For example, drop cables are routed from intermediate access locations 104 to subscriber locations 115. Drop cables can also be routed directly from breakout locations 125 to subscriber locations 115 hereby bypassing any intermediate access locations.

Branch cables can manually be separated out from a main cable in the field using field splices. Field splices are typically housed within sealed splice enclosures. Manual splicing in the field is time consuming and expensive.

As an alternative to manual splicing in the field, pre-terminated cable systems have been developed. Pre-terminated cable systems include factory integrated breakout locations manufactured at predetermined positions along the length of a main cable (e.g., see U.S. Pat. Nos. 4,961,623; 5,125,060; and 5,210,812).

SUMMARY

Aspects of the present disclosure relate to mid-span breakout configurations for pre-terminated fiber optic distribution cables.

One aspect of the present disclosure relates to a mid-span breakout configuration including an over-molded enclosure and tensile reinforcement for strengthening the breakout configuration.

Another aspect of the present disclosure relates to a mid-span breakout configuration including an optical fiber breakout block and a tether retention block each having structure for anchoring tensile reinforcement that resists stretching of the breakout configuration.

A further aspect of the present disclosure relates to a mid-span breakout configuration including an optical fiber breakout block having structure that prevents overmold material from entering the interior of the optical fiber breakout block.

Still another aspect of the present disclosure relates to a mid-span breakout configuration including an optical fiber breakout block having structure that prevents a bonding material such as epoxy from entering an optical fiber breakout passage defined within the interior of the optical fiber breakout block.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

FIG. 2 is a cross-sectional view of an example distribution cable;

FIG. 3 is a left side view of a mid-span breakout location having features that are examples of inventive aspects in accordance with the principles of the present disclosure;

FIG. 4 is an enlarged right side view of the mid-span breakout location of FIG. 3 with an over-mold, wrapping tape, and a protective sleeve removed but represented by dashed outlines;

FIG. 5 is an enlarged right side view of the mid-span breakout location of FIG. 3 with the over-mold and tensile reinforcing member removed, the wrapping tape showing as transparent, and the protective sleeve removed but represented in dashed outline;

FIG. 10 is a right side view of the breakout block of FIG. 7;

FIG. 54 shows a first preparation step for the tether cable of FIG. 6 used at the mid-span breakout location of FIG. 3;

FIG. 55 shows an initial preparation of the distribution cable of FIG. 2 at the mid-span breakout location of FIG. 3;

DETAILED DESCRIPTION

Figure 1:
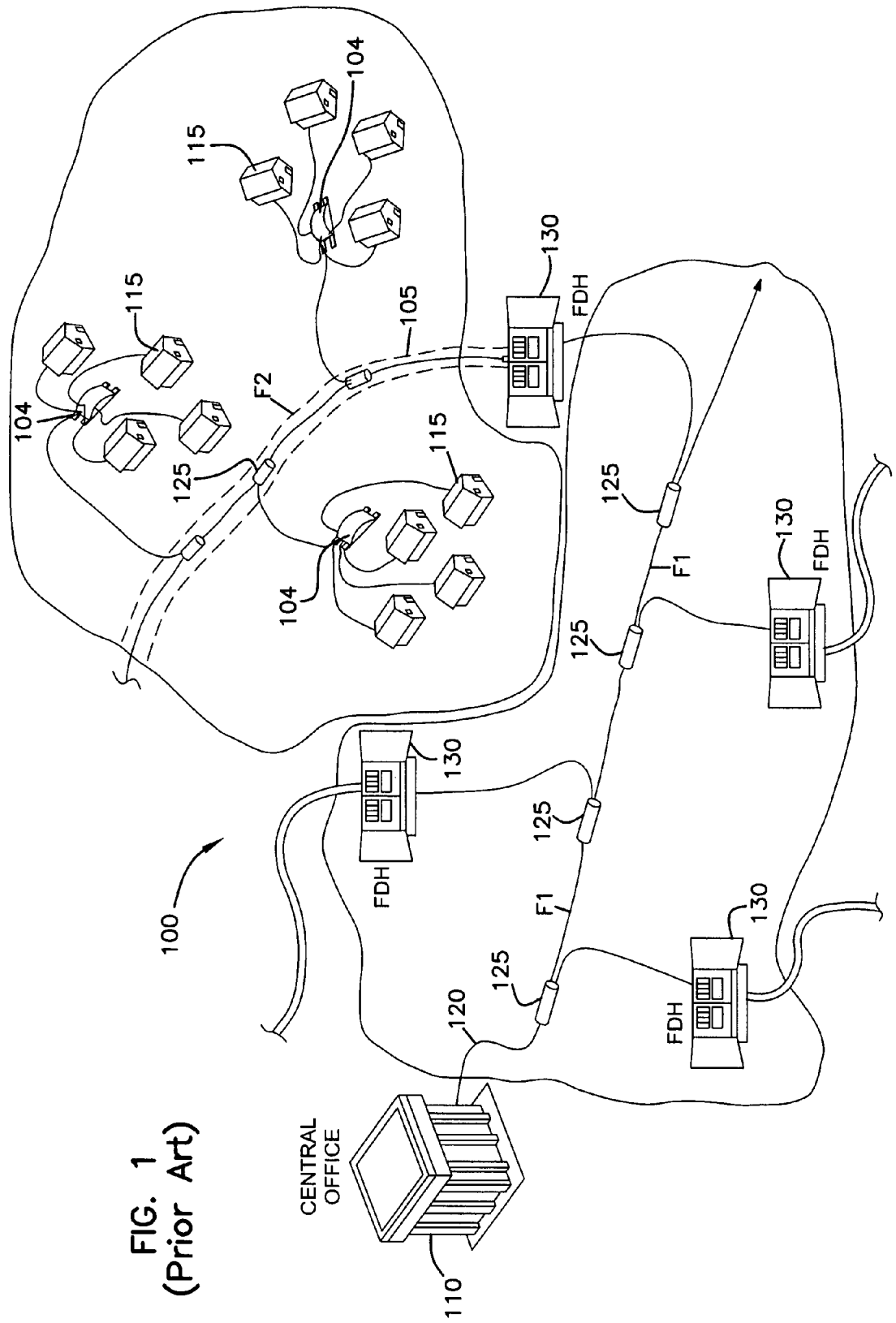
FIG. 1 shows a prior art passive fiber optic network.

The present disclosure relates to mid-span breakout arrangements provided on distribution cables.

FIG. 2 shows an example distribution cable 220 including six separate buffer tubes 222 each containing twelve optical fibers 224. The fibers can include either ribbon fibers or loose fibers. The buffer tubes 222 may be gel filled. The distribution cable 220 also includes a central strength member 226 for reinforcing the cable 220. The distribution cable 220 further includes an outer jacket 230 that encloses the buffer tubes 222. In certain embodiments, ripcords 232 can be provided for facilitating tearing away portions of the jacket 230 to access the optical fibers 224 within the jacket 230. The distribution cable 220 can also include a strength layer 228 for providing further tensile reinforcement to the distribution cable 220. In one embodiment, the strength layer includes a plurality of strength members such as aramid yarn (i.e., KEVLAR®) for further reinforcing the cable.

The distribution cable 220 of FIG. 2 is merely one example of a type of cable to which the various aspects of the present disclosure apply. Other distribution cable configurations can also be used. For example, the distribution cable can include an outer jacket enclosing a single buffer tube and at least two strength members extending on opposite sides of the single buffer tube. An outer strength member such as aramid yarn can surround the single buffer tube within the jacket. The single buffer tube can enclose loose fibers or ribbon fibers.

A typical mid-span breakout location is provided at an intermediate point along the length of a distribution cable. Commonly one or more tethers (e.g., drop cables or stub cables) branch out from the distribution cable at the breakout location. Each tether most commonly has a fewer number of fibers as compared to the number of fibers provided within the distribution cable. In an example embodiment, each tether has no more than twelve fibers. The tethers include fibers that extend between first and second ends. The first ends of the tether fibers are preferably spliced to selected fibers of the distribution cable at the breakout location. The second ends of the tether fibers can either be connectorized or unconnectorized. In certain embodiments, the tether 244 is less than 3 feet long. In other embodiments, the tether 244 is more than 3 feet long. In certain embodiments, the tether forms a drop cable.

In other embodiments, the tether forms a stub cable. In certain embodiments, the tether extends to an intermediate access locations 104. In other embodiments, the tether may extend to the premises of an end user 115. In still other embodiments, the tether may extend to a fiber distribution hub (FDH) 130.

FIGS. 3-5 illustrate a fiber optic cable assembly 240 having features that are examples of inventive aspects in accordance with the principles of the present disclosure. The fiber optic cable assembly includes a distribution cable 220 and tethers 244 that branch from the distribution cable 220 at a mid-span breakout location 246. Multi-fiber optic connectors 243 are mounted at free ends of the tethers 244. As shown at FIG. 4, the breakout location 246 includes splice locations 245 where selected optical fibers $224_{dc}$ of the main distribution cable 220 are spliced to corresponding optical fibers $224_t$ of the tethers 244. Splice sleeves 248 are provided over the splices at the splice locations 245. The splice sleeves 248 are within a protective sleeve 250 (e.g., a plastic tube) that extends along a length of the breakout location 246 and has a first end 252 supported by a breakout block 254 and an opposite second end 256 supported by a retention block 258.

The breakout location 246 has a front end 292 and a rear end 294 that correspond to a common field installation process of pulling the front end 292 through a conduit 105 first with the rear end 294 and the tethers 244 trailing. Other installation processes are also possible.

The breakout block 254 of the mid-span breakout location 246 is secured (e.g., bonded) to the distribution cable 220 and functions to guide the optical fibers $224_{dc}$ outwardly from the distribution cable 220 into the first end 252 of the protective sleeve 250. The retention block 258 of the mid-span breakout location 246 is also secured (e.g., bonded) to the distribution cable 220 and functions to direct the optical fibers $224_t$ from the tethers 244 into the second end 256 of the protective sleeve 250. The retention block 258 further functions to anchor the tethers 244 to the distribution cable 220. An over-mold 260 is provided at the breakout location 246 for covering the breakout components (e.g., the breakout block 254, the protective sleeve 250 and the retention block 258). The over-mold 260 forms a flexible, protective enclosure/package that surrounds the distribution cable 220 and seals mid-span breakout location 246. In certain embodiments, a wrap of heat resistant tape 263 can be wrapped about the distribution cable 220 at the mid-span breakout location 246 to provide an intermediate layer between the breakout components and the over-mold 260. In certain embodiments, a non-heat resistant tape can be substituted for the heat resistant tape 263. Wrapping the heat resistant tape 263 about and between the breakout block 254 and the retention block 258, as shown in FIG. 5, may also provide a fixturing function in the manufacturing process (e.g., securing various pieces together during the over-mold 260 application process). In certain embodiments, the heat resistant tape 263 may be used to prevent the over-mold material from flowing into undesired areas during the over-mold 260 application process.

Figure 6:
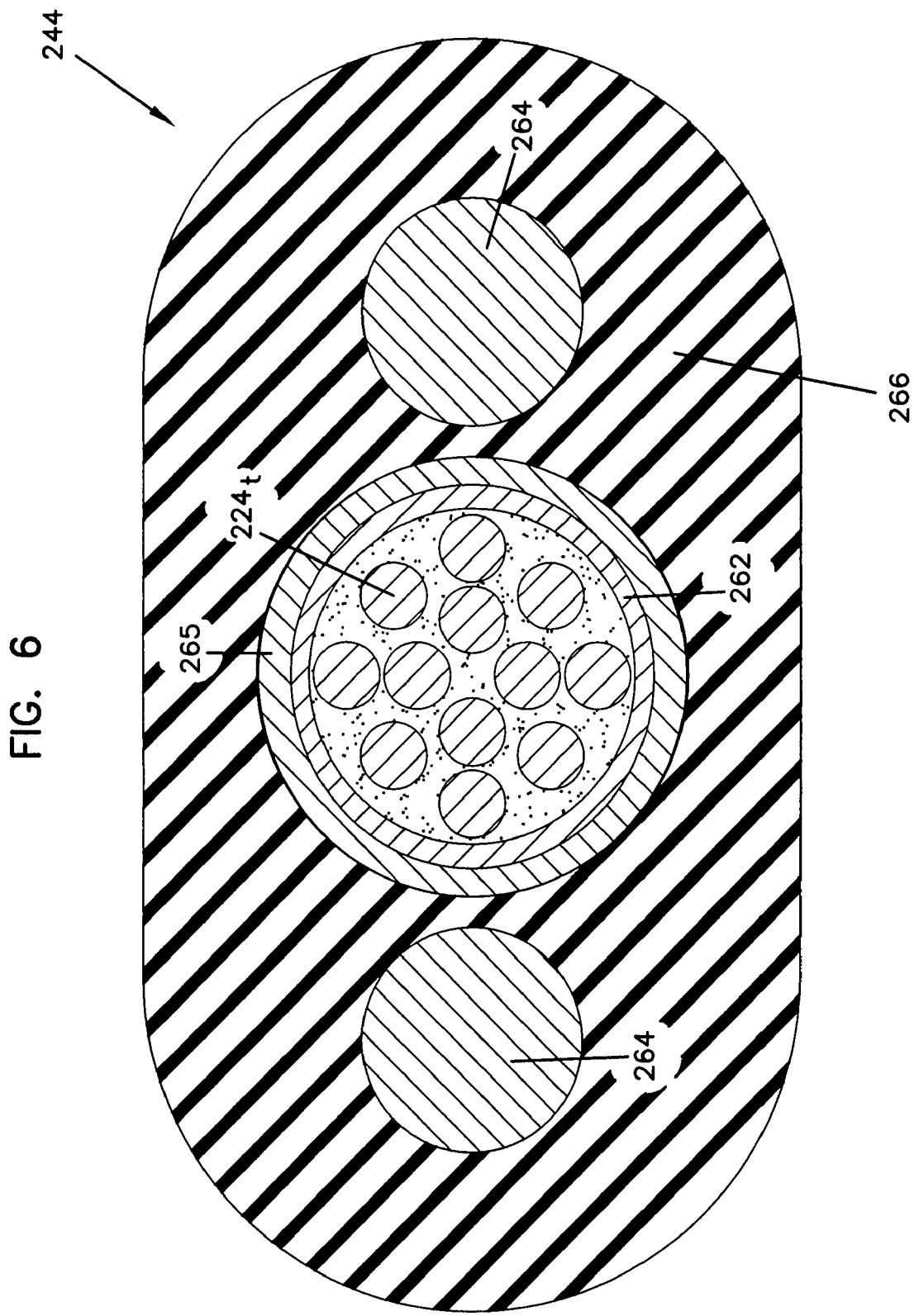
FIG. 6 is a cross-sectional view of an example tether cable.
Figure 7:
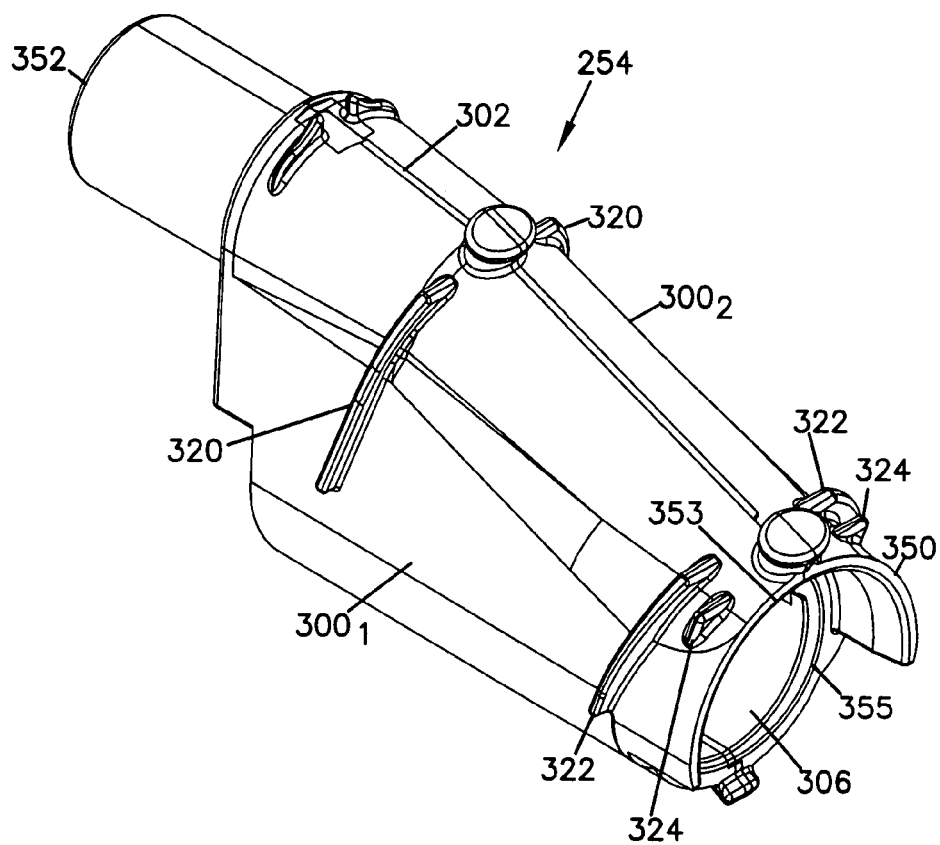
FIG. 7 is a perspective view showing the front, top, and right side of an example breakout block.

FIG. 6 is a cross-sectional view representative of an example configuration for the tethers 244 joined to the distribution cable 220 at the breakout location 246. The depicted configuration has a flat profile and includes a central buffer tube 262 containing a plurality of optical fibers $224_t$ (e.g., typically one to twelve loose or ribbonized fibers). Strength members 264 (e.g., flexible rods formed by glass fiber reinforced epoxy) are positioned on opposite sides of the central buffer tube 262. An outer jacket 266 surrounds the strength members 264 and the buffer tube 262. The outer jacket 266 includes an outer perimeter having an elongated transverse cross-sectional shape. An additional strength layer 265 (e.g., aramid yarn) can be positioned between the buffer tube 262 and the outer jacket 266.

When the tethers 244 are secured to the distribution cable 220, the tethers 244 should each preferably be able to withstand a pullout force of at least 100 pounds. To meet this pullout force requirement, the retention block 258 is used to strengthen the mechanical interface between the tethers 244 and the distribution cable 220. The optical fibers $224_t$ of the tethers 244 are terminated at the multi-fiber fiber optic connectors 243 mounted at the free ends of the tethers 244.

It is preferred for the over-mold 260 to be sized with a cross-sectional shape sufficient to allow the breakout location to be readily passed through a one and one-half inch inner diameter conduit or a one and one-quarter inch inner diameter conduit. In certain embodiments, the breakout location has a cross-sectional area that can be passed through a one inch inner diameter conduit.

The mid-span breakout location 246 is preferably configured to be bent/flexed in any orientation without damaging the optical fibers $224dc$, $224t$ and without significantly negatively affecting cable performance. In one embodiment, this flexibility is provided by making sure that the optical fibers $224_{dc}$, $224_t$ have sufficient excess fiber length (i.e., slack) to allow the breakout location to be bent/flexed the requisite amount. In one embodiment, the optical fibers $224dc$, $224t$ that extend along the mid-span breakout location 246 are provided with at least 2% excess fiber length. Further details regarding providing excess fiber length at a breakout location can be found at U.S. patent application Ser. No. 11/491,340, now U.S. Pat. No. 7,422,378, issued Sep. 09, 2008, entitled FIBER OPTIC CABLE BREAKOUT CONFIGURATION WITH EXCESS FIBER LENGTH, now U.S. Pat. No. 7,422,378, issued Sep. 9, 2008, which are hereby incorporated by reference in their entirety.

To maintain a desired amount of slack within the optical fibers $224_{dc}$, $224_t$ located within the protective sleeve 250, it is desired to maintain a set spacing S between the breakout block 254 and the retention block 258. To ensure that the spacing S is maintained, the mid-span breakout location 246 includes a tensile reinforcing arrangement that mechanically ties or links the breakout block 254 to the retention block 258. The tensile reinforcing structure assists in maintaining the spacing S by resisting stretching of the over-mold 260 at the mid-span breakout location 246. In the embodiment of FIG. 4, the tensile reinforcing arrangement includes a tensile reinforcing member 270 that extends between the breakout block 254 and the retention block 258, and is anchored to the breakout block 254 and the retention block 258. In one embodiment, the tensile reinforcing member 270 is a flexible member such as a rope, string, strand, or wire. In a preferred embodiment, the tensile reinforcing member 270 is constructed of aramid yarn (i.e., KEVLAR®).

Figure 9:
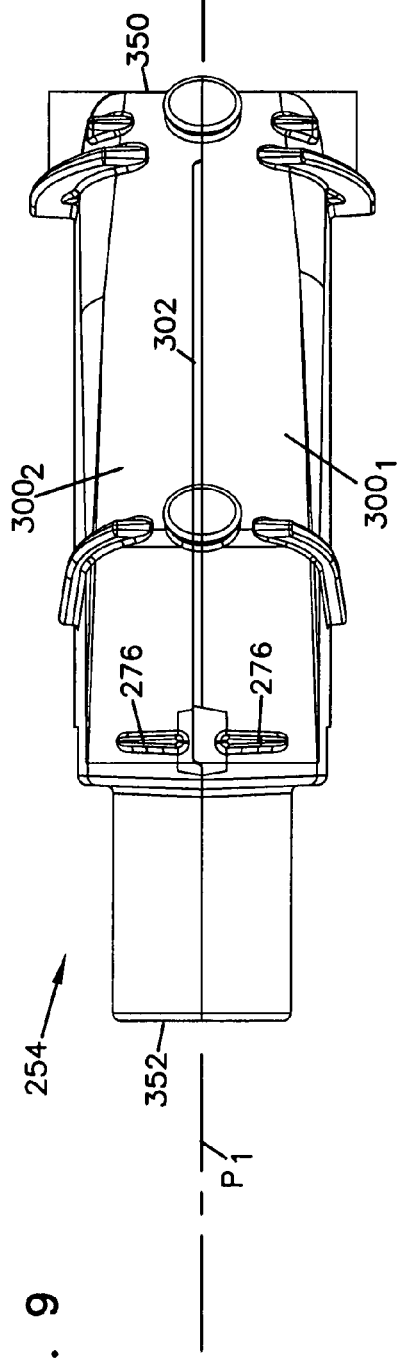
FIG. 9 is a top view of the breakout block of FIG. 7.
Figure 11:
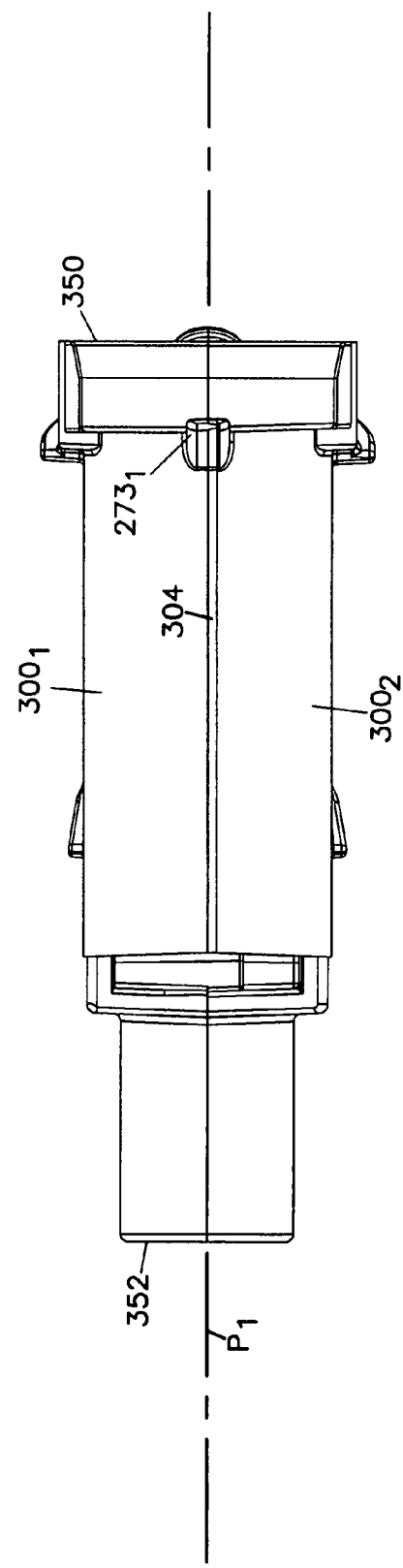
FIG. 11 is a bottom view of the breakout block of FIG. 7.
Figure 12:
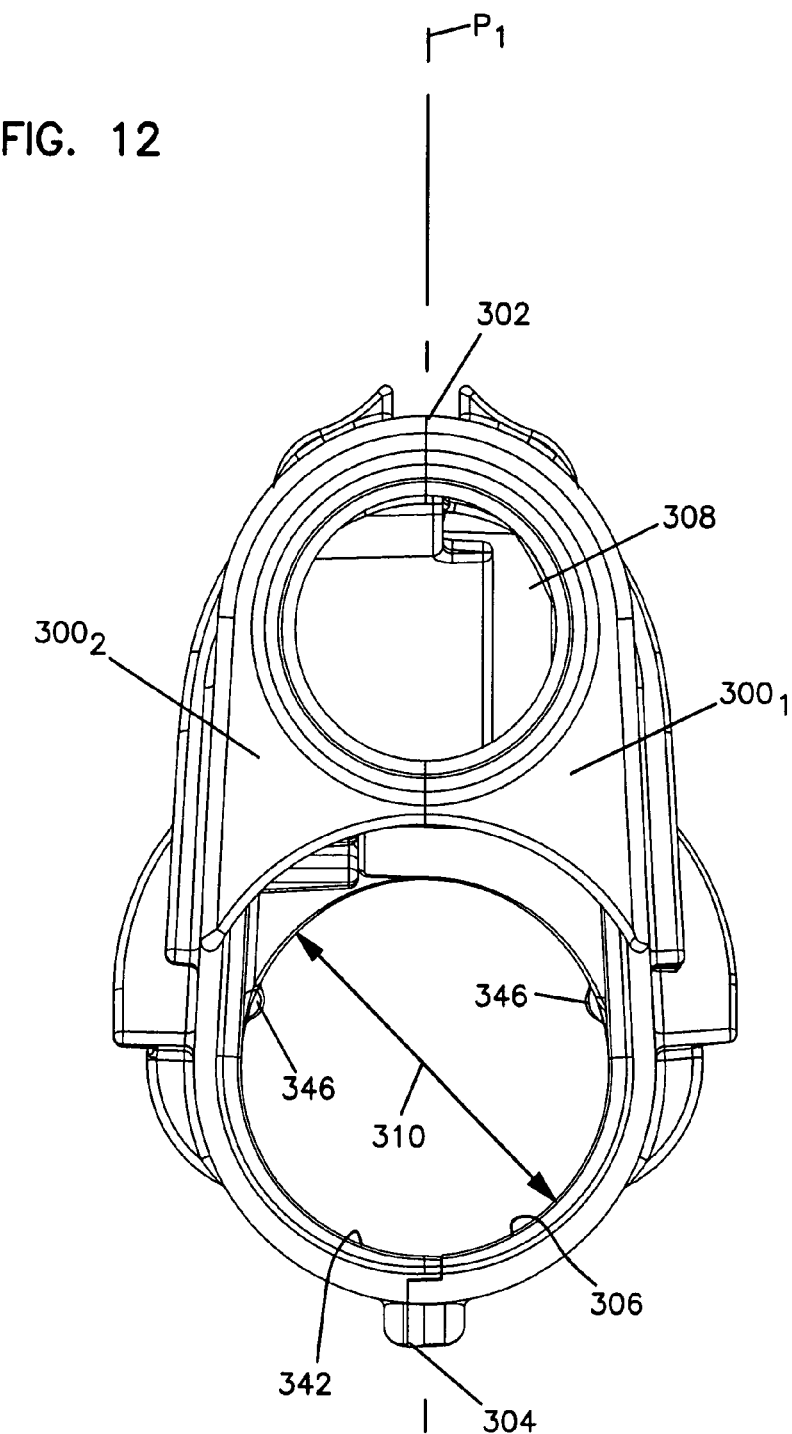
FIG. 12 is a rear view of the breakout block of FIG. 7.
Figure 33:
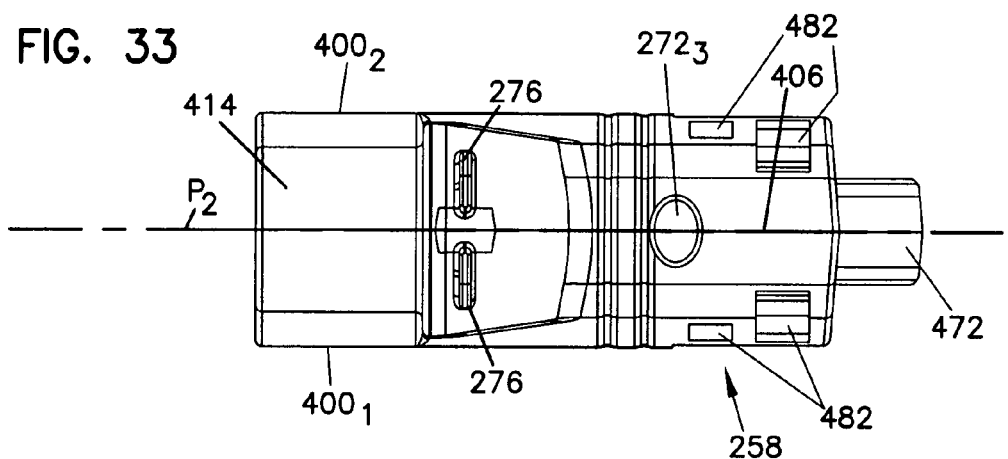
FIG. 33 is a top view of the retention block of FIG. 31.
Figure 34:
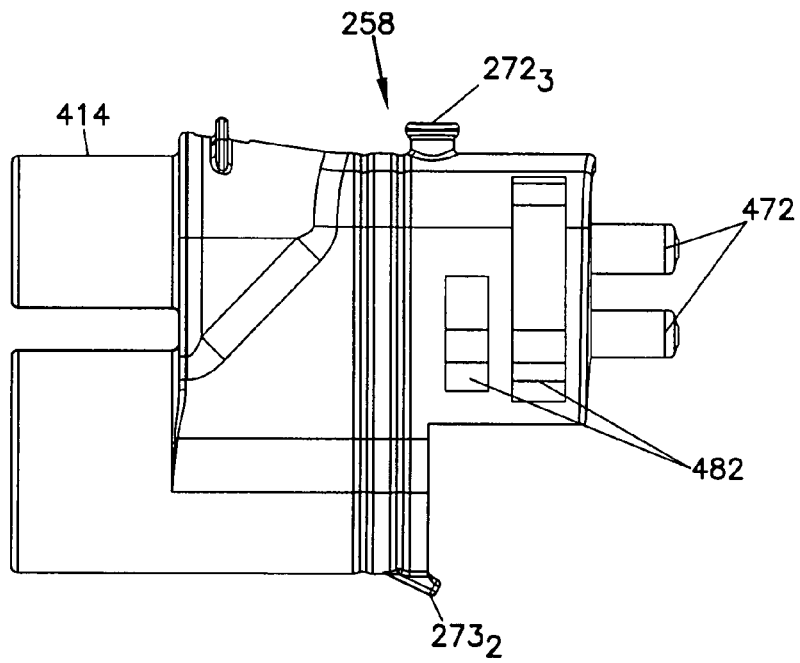
FIG. 34 is a left side view of the retention block of FIG. 31.
Figure 35:
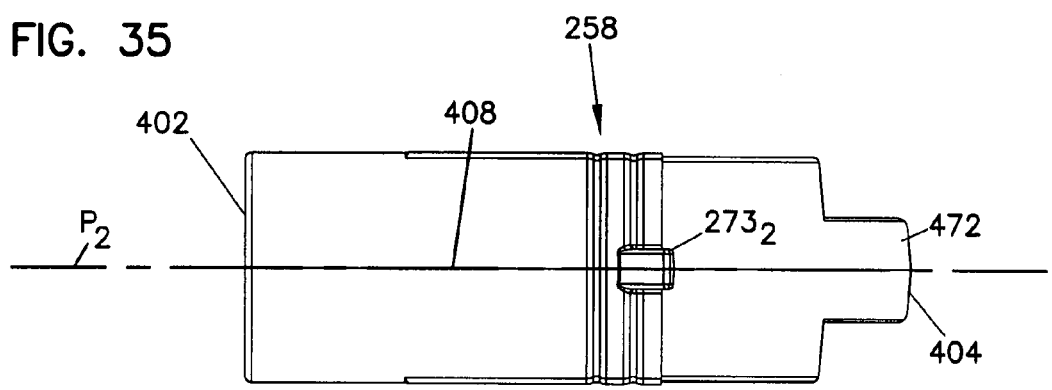
FIG. 35 is a bottom view of the retention block of FIG. 31.
Figure 36:
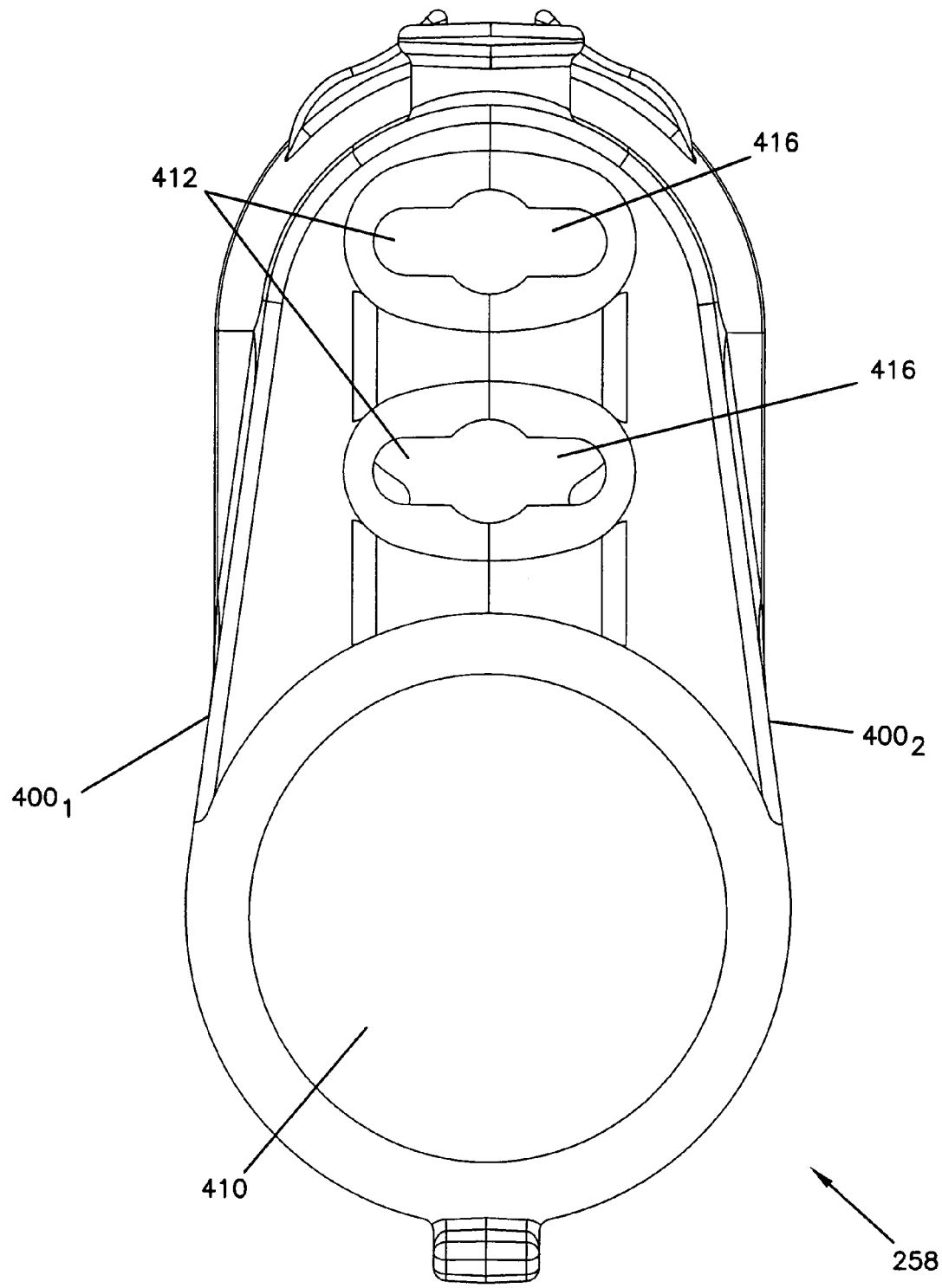
FIG. 36 is a rear view of the retention block of FIG. 31.
Figure 37:
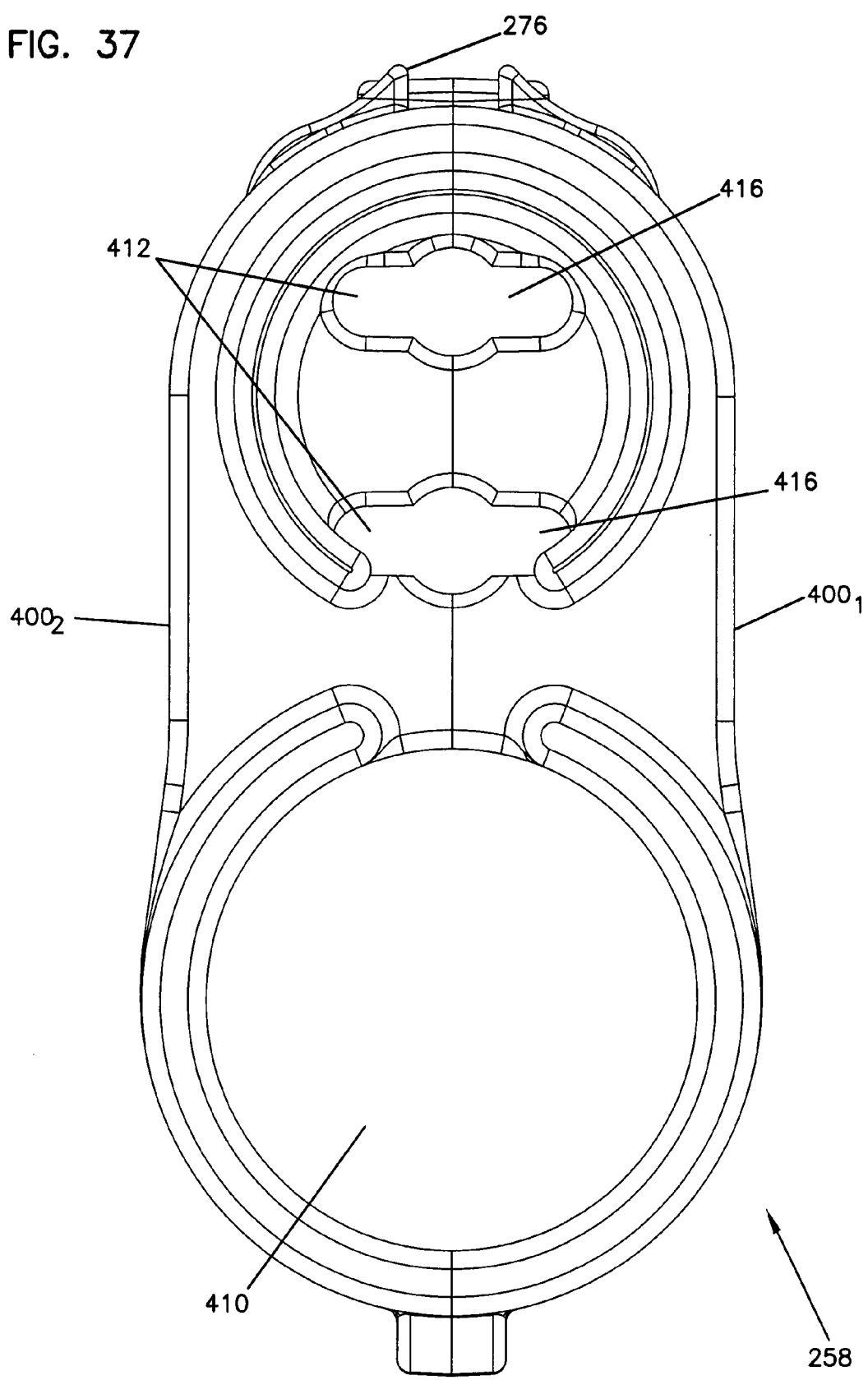
FIG. 37 is a front view of the retention block of FIG. 31.
Figure 38:
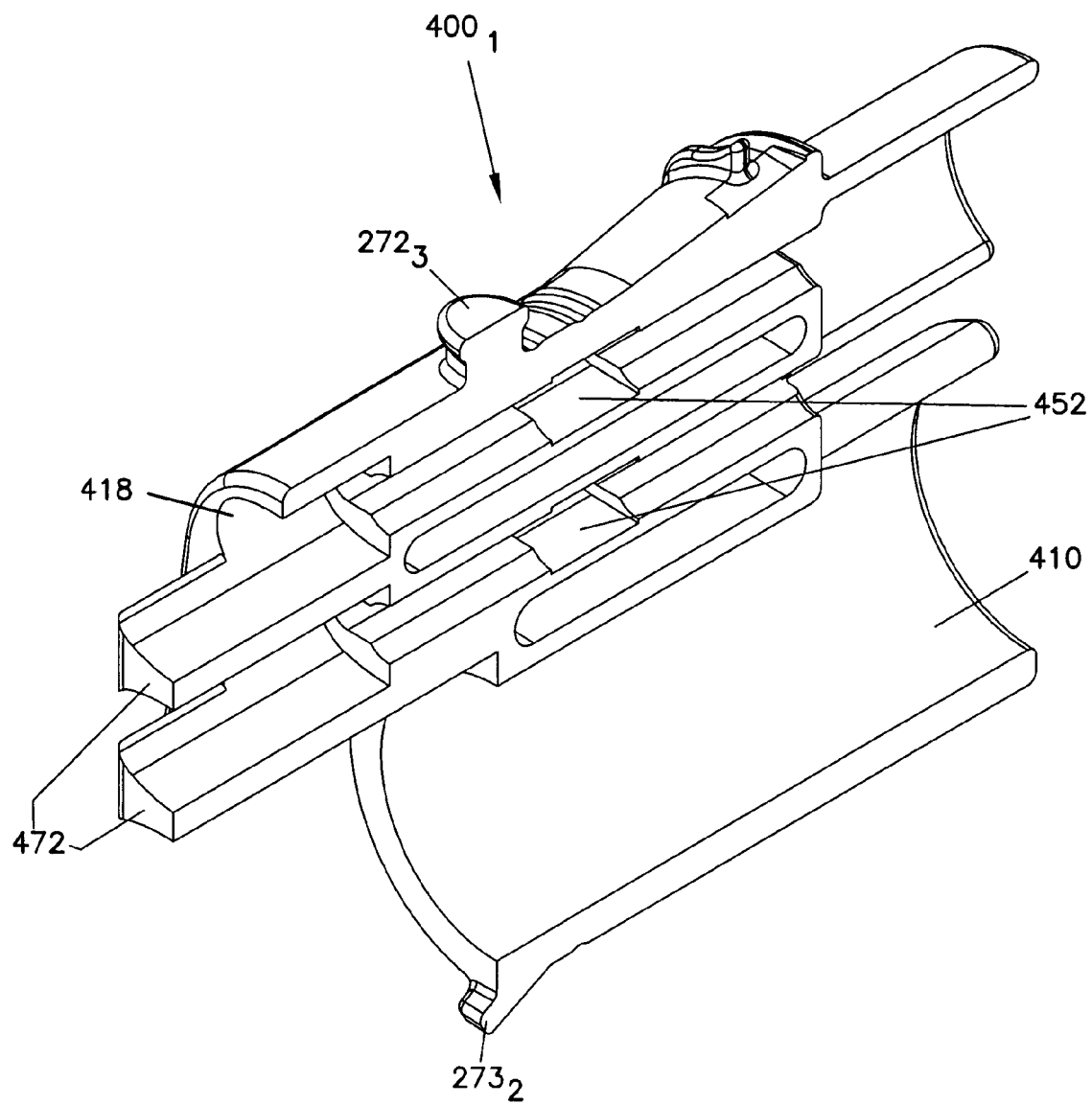
FIG. 38 is a perspective view showing the rear, top, and inside of a first piece of the retention block of FIG. 31.
Figure 39:
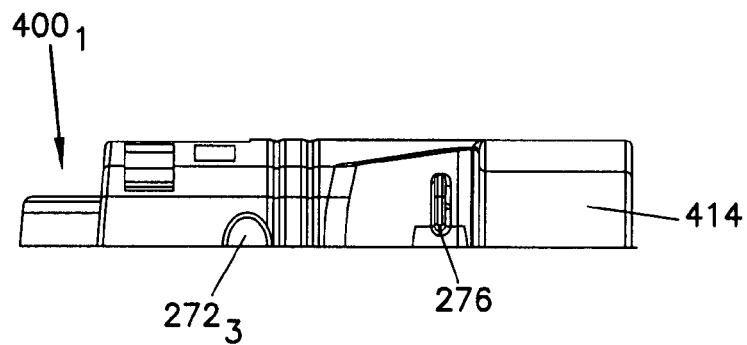
FIG. 39 is a top view of the first retention block piece of FIG. 38.
Figure 40:
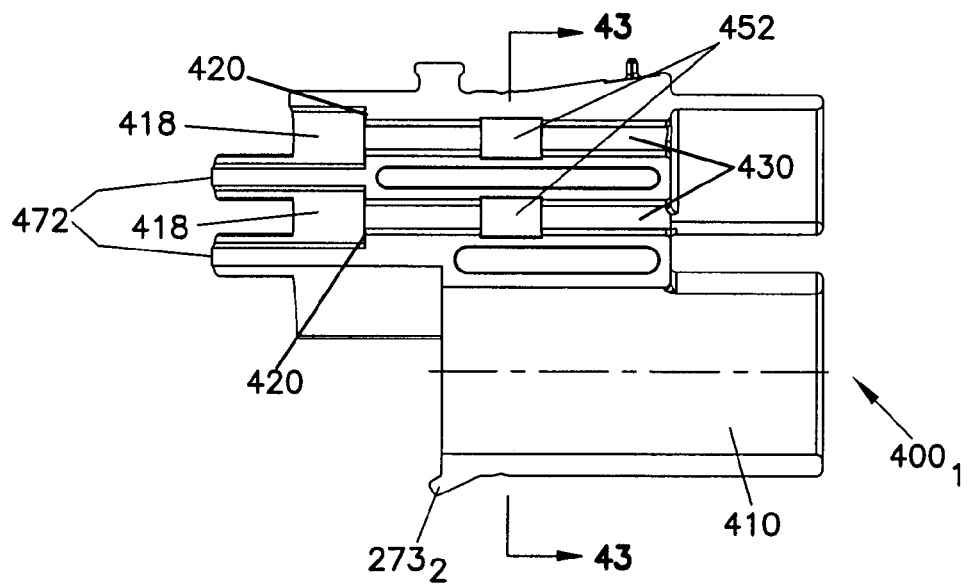
FIG. 40 is a right side (inside) view of the first retention block piece of FIG. 38.
Figure 41:
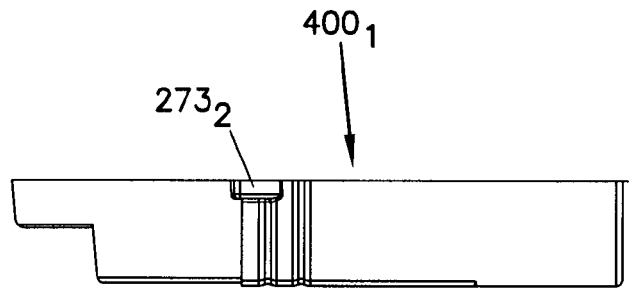
FIG. 41 is a bottom view of the first retention block piece of FIG. 38.
Figure 42:
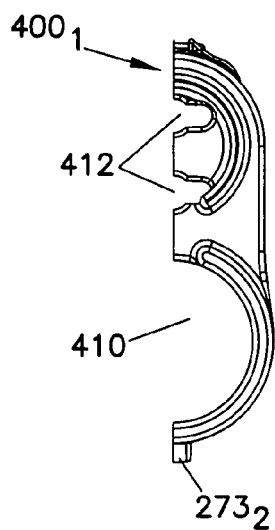
FIG. 42 is a front view of the first retention block piece of FIG. 38.
Figure 43:
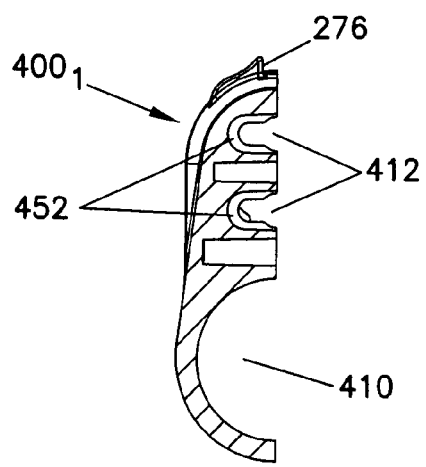
FIG. 43 is a cross-sectional view of the first retention block piece of FIG. 38 taken along section line 43-43 of FIG. 40.
Figure 44:
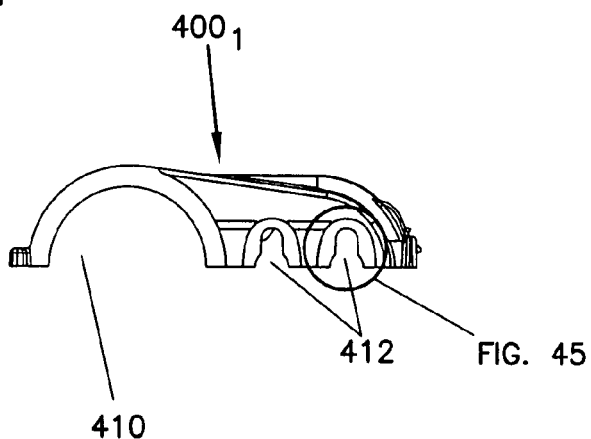
FIG. 44 is a rear view of the first retention block piece of FIG. 38.
Figure 45:
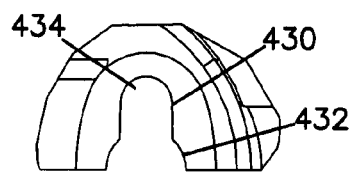
FIG. 45 is an enlarged partial view of the first retention block piece of FIG. 38 taken as indicated from FIG. 44.
Figure 46:
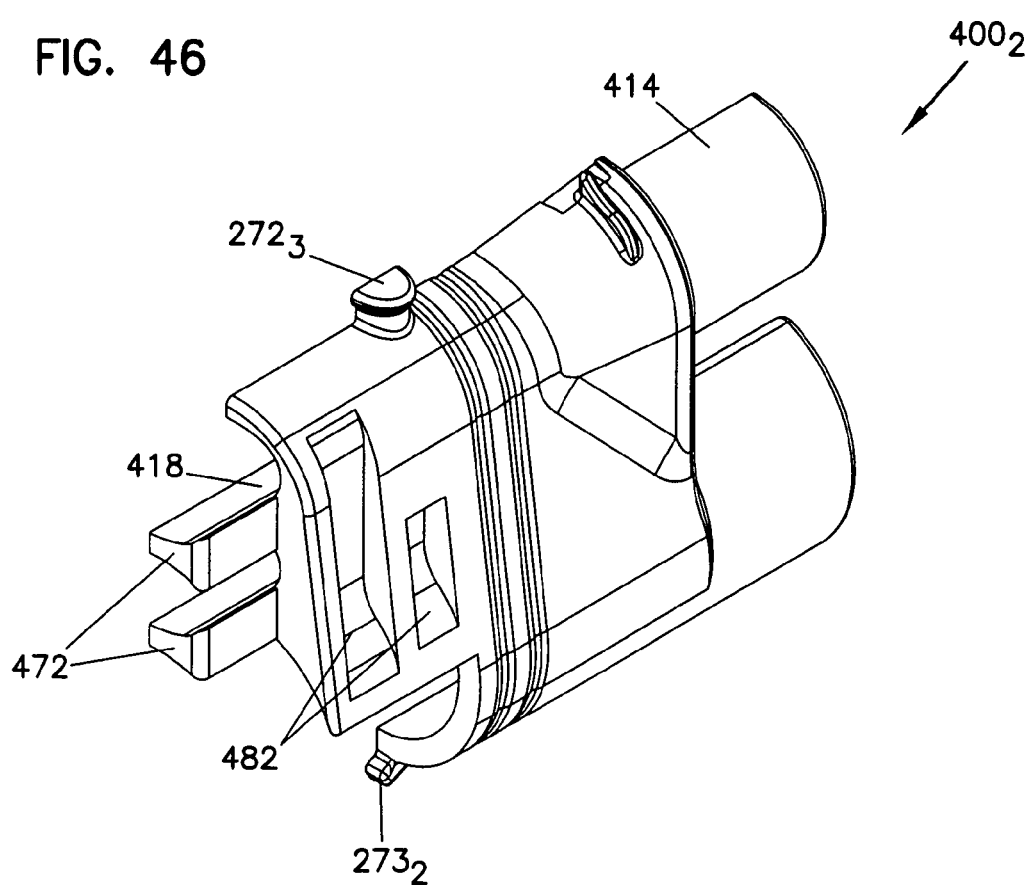
FIG. 46 is a perspective view showing the rear, top, and outside of a second piece of the retention block of FIG. 31.
Figure 53:
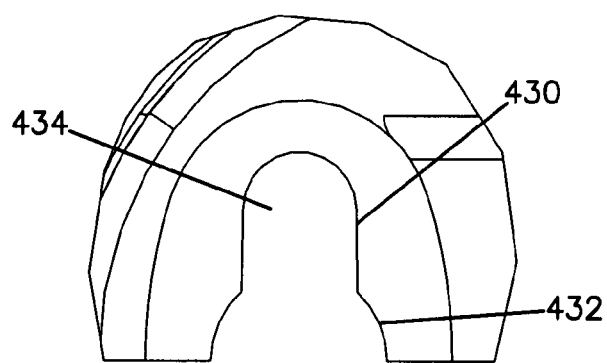
FIG. 53 is an enlarged partial view of the second retention block piece of FIG. 46 taken as indicated from FIG. 52.
Figure 47:
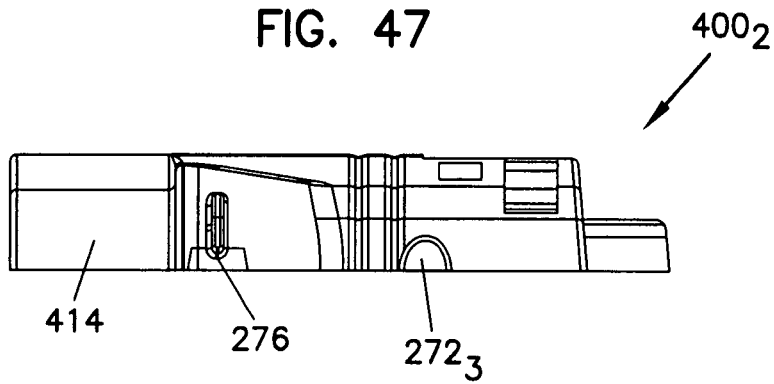
FIG. 47 is a top view of the second retention block piece of FIG. 46.
Figure 48:
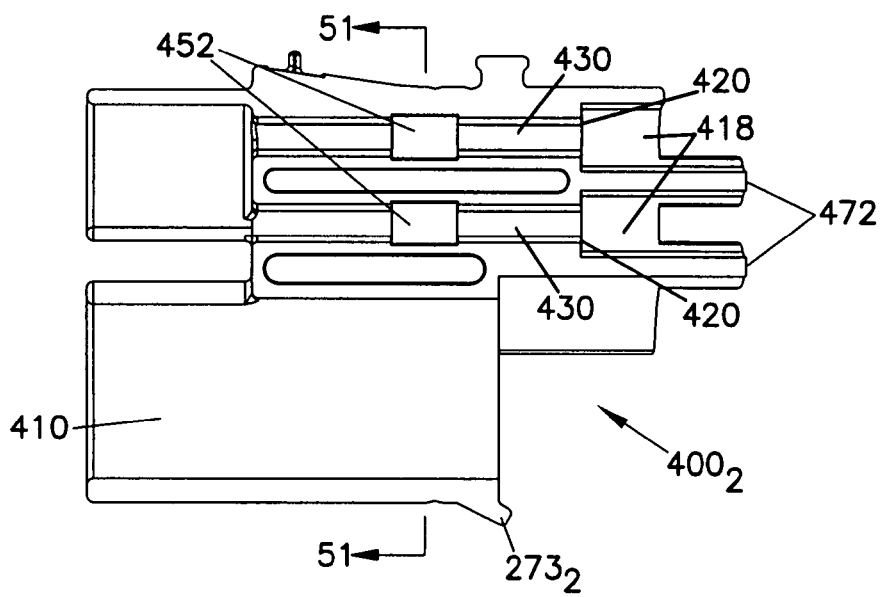
FIG. 48 is a left side (inside) view of the second retention block piece of FIG. 46.
Figure 49:
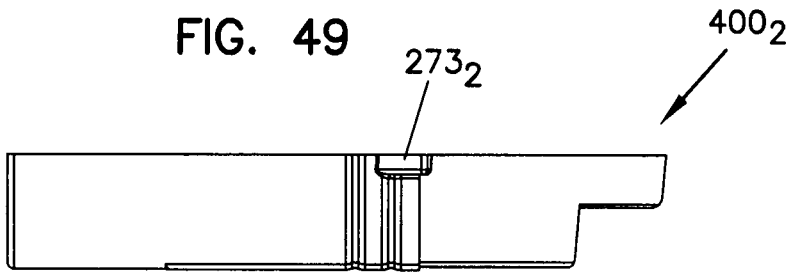
FIG. 49 is a bottom view of the second retention block piece of FIG. 46.
Figure 50:
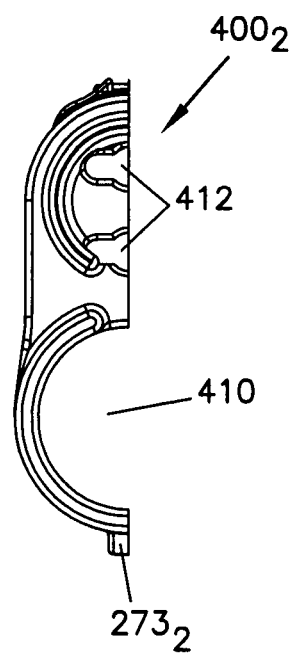
FIG. 50 is a front view of the second retention block piece of FIG. 46.
Figure 51:
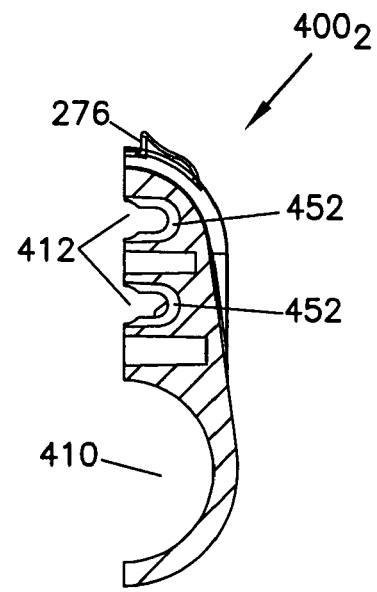
FIG. 51 is a cross-sectional view of the second retention block piece of FIG. 46 taken along section line 51-51 of FIG. 48.
Figure 52:
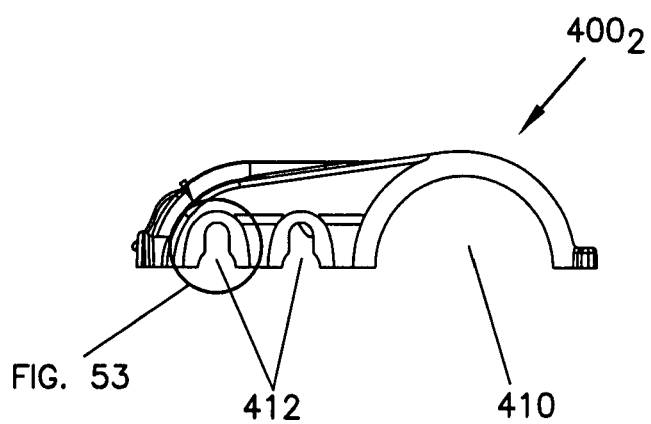
FIG. 52 is a rear view of the second retention block piece of FIG. 46.

Referring still to FIG. 4, the breakout block 254 and the retention block 258 include features that facilitate anchoring the tensile reinforcing member 270 thereto. For example, the breakout block 254 includes two anchoring posts $272_1$, $272_2$ and an anchoring tab $273_1$. The anchoring post $272_1$, $272_2$ and the anchoring tab $273_1$ are centered along a plane $P_1$ (see FIGS. 9 and 11) that bisects the breakout block 254 and also bisects the distribution cable 220. The anchoring posts $272_1$, $272_2$ are positioned at one side of the distribution cable 220 while the anchoring tab $273_1$ is located at the opposite side of the distribution cable 220. As depicted in FIG. 4, the anchoring posts $272_1$, $272_2$ are located at top side of the breakout block 254 while the anchoring tab $273_1$ is located at a bottom side of the breakout block 254. The retention block 258 also includes an anchoring post $272_3$ and an anchoring tab $273_2$. The anchoring post $272_3$ and anchoring tab $273_2$ are centered along a plane $P_2$ (see FIGS. 33 and 35) that bisects the retention block 258 and also bisects the distribution cable 220. As shown in FIG. 4, the anchoring post $272_3$ is located at a top side of the retention block 258 in axial alignment with the anchoring posts $272_1$, $272_2$ of the breakout block 254, and the anchoring tab $273_2$ is located at a bottom side of the retention block 258 in axial alignment with the anchoring tab $273_1$ of the breakout block 254. The plane $P_1$ bisecting the breakout block 254 and the plane $P_2$ bisecting the retention block 258 are preferably coplanar when the breakout block 254 and the retention block 258 are mounted on the distribution cable 220.

In the embodiment of FIG. 4, the tensile reinforcing member 270 includes a first segment $270_1$ and a second segment $270_2$. The first segment $270_1$ extends from the breakout block 254 to the retention block 258 at a location on a first side (e.g., a bottom side) of the distribution cable 220. The second segment $270_2$ extends from the breakout block 254 to the retention block 258 at an opposite second side (e.g., a top side) of the distribution cable 220. The first and second segments $270_1$, $270_2$ are preferably generally parallel to the central axis of the distribution cable 220. Portions of the tensile reinforcing member 270 are wrapped about and/or tied to the anchoring posts $272_1$-$272_3$ and the anchoring tabs $273_1$, $273_2$ to mechanically secure the tensile reinforcing member 270 to the breakout block 254 and the retention block 258. The anchoring tabs $273_1$, $273_2$ assist in maintaining the first segment $270_1$ of the tensile reinforcing member 270 centered along the bottom side of the distribution cable 220. Centering members 276 provided on the breakout block 254 and the retention block 258 assist in maintaining the second segment $270_2$ of the tensile reinforcing member 270 centered along a top side of the protective sleeve 250. The first and second segments $270_1$, $270_2$ cooperate to provide tensile reinforcement to the breakout location 246 to maintain the spacing S between the breakout block 254 and the retention block 258. The first and second segments $270_1$, $270_2$ also provide reinforcing redundancy such that reinforcement is still provided in the event one of the segments breaks.

In one embodiment, the tensile reinforcing member 270 is initially wrapped about or tied to the anchoring post $272_1$ and routed down to anchoring tab $273_1$. The tensile reinforcing member 270 is then routed about the anchoring tab $273_1$ and extended from the anchoring tab $273_1$ across the bottom of the mid-span breakout location 246 to the anchoring tab $273_2$. The tensile reinforcing member 270 then loops about the anchoring tab $273_2$ and is routed back to the anchoring tab $273_1$ where the tensile reinforcing member 270 loops about the tab $273_1$ and is routed back up to the anchoring post $272_1$. The tensile reinforcing member 270 is wrapped about or tied to the anchoring post $272_1$ so that the first segment $270_1$ is independently anchored. Thereafter, the tensile reinforcing member 270 is routed from the anchoring post $272_1$ to the anchoring post $272_2$ where the tensile reinforcing member 270 is wrapped about or tied to the anchoring post $272_2$. The tensile reinforcing member 270 is then routed from the anchoring post $272_2$ to the anchoring post $272_3$, is wrapped about or tied to the anchoring post $272_3$, and is then routed back to the anchoring post $272_2$. The tensile reinforcing member 270 is then wrapped about or tied to the anchoring post $272_2$ to provide independent anchoring of the second segment $270_2$. In other embodiments, the tensile reinforcing member 270 can be wrapped multiple times about the breakout block 254 and the retention block 258 (e.g., looped about the top and bottom sides of the blocks 254, 258) to provide for further anchoring of the tensile reinforcing member 270. Wrapping the tensile reinforcing member 270 about the breakout block 254 and the retention block 258, as shown in FIG. 4, may also provide a fixturing function in the manufacturing process (e.g., securing various pieces together during the over-mold 260 application process). In other embodiments, the tensile reinforcing member 270 can include multiple separate pieces. In still other embodiments, the tensile reinforcing member 270 can be secured to the breakout block 254 and the retention block 258 by a bonding material.

The tensile reinforcing member 270 may significantly contribute to the strength of the mid-span breakout location 246 and carry a significant portion of a tensile load applied across the breakout location 246.

In certain embodiments, the tensile reinforcing member 270 may develop significant friction with the over-mold 260 and/or the heat resistant tape 263. This friction may further contribute to stretch resistance across the breakout location 246.

Referring to FIGS. 7-30, the breakout block 254 provided at the mid-span breakout location 246 includes a first piece $300_1$ (FIGS. 13-21) that forms a right side of the breakout block 254 and a second piece $300_2$ (FIGS. 22-30) that forms a left side of the breakout block 254. The first and second pieces $300_1$, $300_2$ are connected at an upper seam 302 and a lower seam 304. In one embodiment, a bonding material (e.g., epoxy) is used at the upper and lower seams 302, 304 to connect the first and second pieces $300_1$, $300_2$ together.

Figure 8:
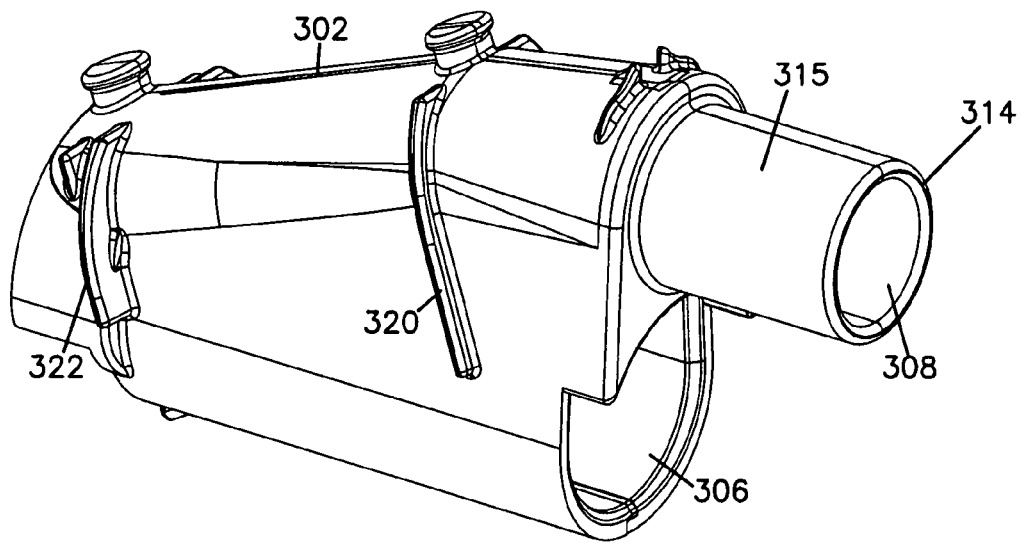
FIG. 8 is a perspective view showing the rear, top, and left side of the breakout block of FIG. 7.

Referring still to FIGS. 7-12, the breakout block 254 defines a straight-through channel 306 and a breakout channel 308. The straight-through channel 306 has an inner diameter 310 that generally matches the inner diameter of the outer jacket 230 of the distribution cable 220. The breakout channel 308 is configured to separate the accessed optical fibers $224_{dc}$ from the distribution cable 220 by routing the optical fibers $224_{dc}$ outwardly from the distribution cable 220 to the protective sleeve 250. The breakout channel 308 includes an opening 312 (see FIGS. 16 and 25) for routing the optical fibers $224_{dc}$ radially outwardly from the distribution cable 220 into the breakout channel 308. The breakout channel 308 also includes a second opening 314 (see FIGS. 16 and 25) for routing the optical fibers $224_{dc}$ outwardly from the breakout channel 308 and into the protective sleeve 250. The opening 314 is oriented along an axis 316 that is generally parallel to the central axis of the distribution cable 220. As best shown at FIG. 8, the opening 314 is defined by a cylindrical stem 315 sized to fit within the first end 252 of the protective sleeve 250.

The breakout block 254 also includes structure for enhancing the mechanical interlock provided between the breakout block 254 and the over-mold 260. For example, first and second sets of parallel fins 320, 322 project outwardly from opposite sides of the main body of the breakout block 254. The fins 320, 322 can also be used to facilitate wrapping the tensile reinforcing member 270 about the breakout block 254. For example, the tensile reinforcing member 270 can be wrapped around the breakout block 254 at a location between the sets of fins 320, 322 such that the fins prevent the wrap from sliding off the breakout block 254. Alternately, the tensile reinforcing member 270 can be wrapped between the fins 320 and tabs 324 to prevent the wrapped tensile reinforcing member 270 from sliding off the breakout block 254.

The upper and lower seams 302, 304 of the breakout block 254 are preferably configured to prevent over-mold material from seeping into the interior of the breakout block 254 during the over-molding process. For example, the first piece $300_1$ has an outer overlap member 326 (see FIG. 21) that extends substantially along the entire length of the upper seam 302. A recess 328 is positioned below the outer overlap member 326. The second piece $300_2$ of the breakout block 254 includes an inner overlap member 330 (see FIG. 30) that extends substantially along the entire length of the upper seam 302. A recess 332 is positioned above the inner overlap member 330. When the first and second pieces $300_1$ and $300_2$ are mated together, the outer overlap member 326 of the first piece $300_1$ overlaps the inner overlap member 330 of the second piece $300_2$. Also, the outer overlap member 326 of the first piece $300_i$ fits within the recess 332 of the second piece $300_2$ and the inner overlap member 330 of the second piece $300_2$ fits within the recess 328 of the first piece $300_1$.

The lower seam 304 has a similar configuration with the first piece $300_1$ having an outer overlap member 334 (see FIG. 19) that extends along the length of the lower seam 304 and a recess 336 positioned above the outer overlap member 334, and the second piece $300_2$ having an inner overlap member 338 (see FIG. 27) that extends along the length of the lower seam 304 and a recess 340 positioned below the inner overlap member 338. When the first piece and the second piece $300_1$, $300_2$ are mated together, the inner overlap member 338 overlaps the outer overlap member 334 and fits in recess 336 while the outer overlap member 334 fits within recess 340.

As indicated above, a bonding material such as epoxy is used to secure the first and second pieces $300_1$, $300_2$ of the breakout block 254 together. Specifically, the bonding material can be applied along the upper and lower seams 302, 304. Bonding material is also applied to a bottom surface 342 of the straight-through channel 306 to secure the breakout block 254 to the distribution cable 220. It is desirable to prevent the bonding material from entering the breakout channel 308 so that the optical fibers $224_{dc}$ are not exposed to the bonding material. To prevent bonding material from entering the breakout channel 308, the breakout block 254 includes overlapping members or fins 343 that form a dam or barrier positioned below the upper seam 302. The barrier provided by the overlapping fins prevents bonding material applied to the upper seam 302 from entering the breakout channel 308. The breakout block 254 also includes barrier ribs 346 that extend across the entrance opening 312 of the breakout channel 308. The barrier ribs 346 are oriented generally parallel to the longitudinal axis of the distribution cable 220. When the breakout block 254 is installed to the distribution cable 220, the bonding material is applied to the bottom surface 342 at a location below the barrier ribs 346. When the breakout block 254 is assembled on the distribution cable, the barrier ribs 346 engage the sides of the distribution cable 220 to form a barrier that prevents the bonding material from migrating upwardly into the breakout channel 308.

Referring to FIGS. 7-12, the breakout block 254 includes a front end 350 positioned opposite from a back end 352. The straight-through channel 306 extends through the breakout block 254 from the front end 350 to the back end 352. The exit opening 314 of the breakout channel 308 defined by the cylindrical stem 315 is positioned at the back end 352 of the breakout block 254. The front end 350 of the breakout block 254 includes a semi-circular skirt or extension 353 that extends rearwardly from a front end face 355 of the breakout block 254. The extension 353 has an inner diameter that is generally equal to the outer diameter of the outer jacket 230 of the distribution cable 220. When the breakout block 254 is assembled onto the distribution cable 220, the front end face 355 of the breakout block 254 abuts against an end surface 231 (see FIG. 55) of the outer jacket 230 and the extension 353 overlaps the outer jacket 230.

Figure 13:
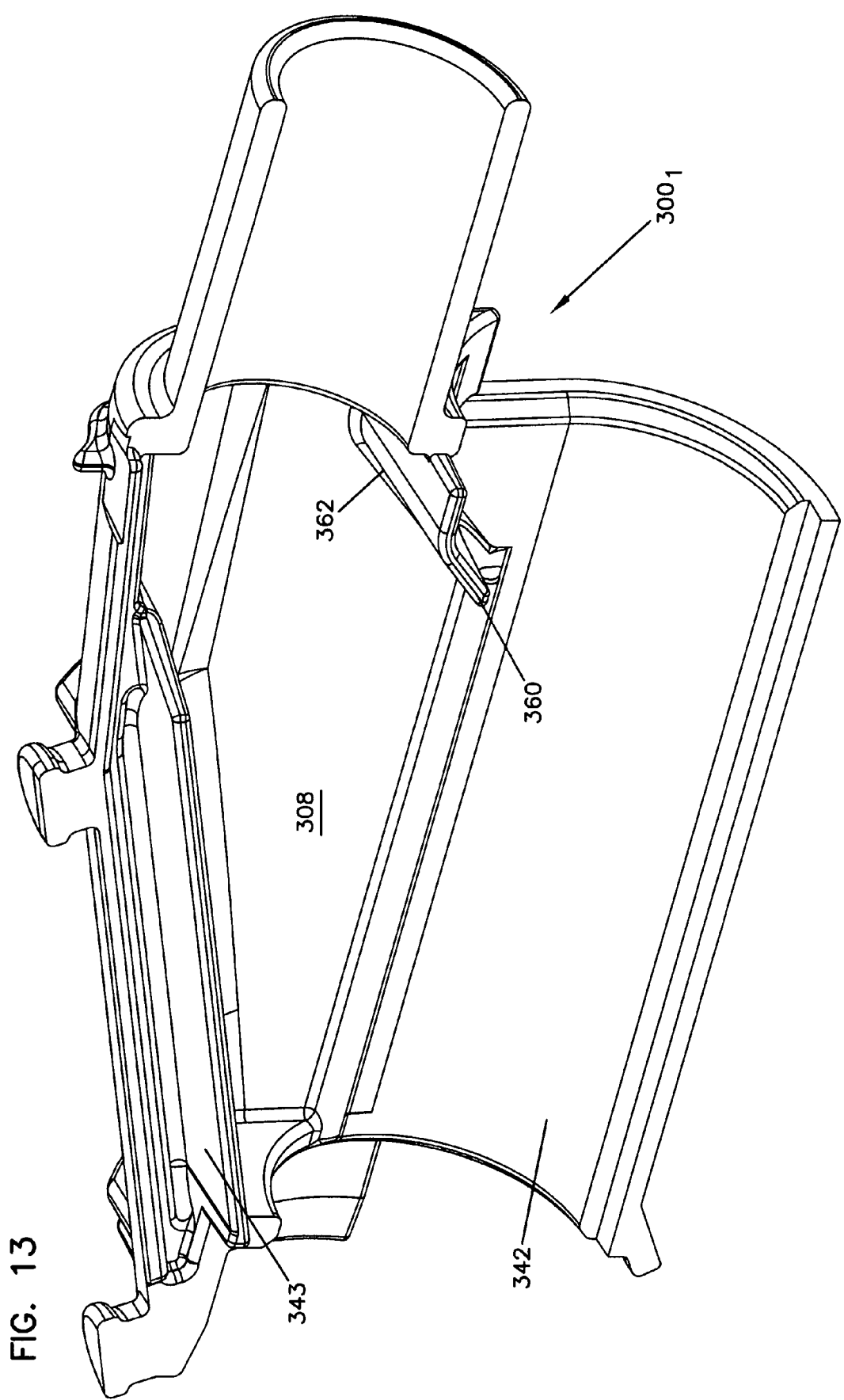
FIG. 13 is a perspective view showing the rear, top, and inside of a first piece of the breakout block of FIG. 7.
Figure 14:
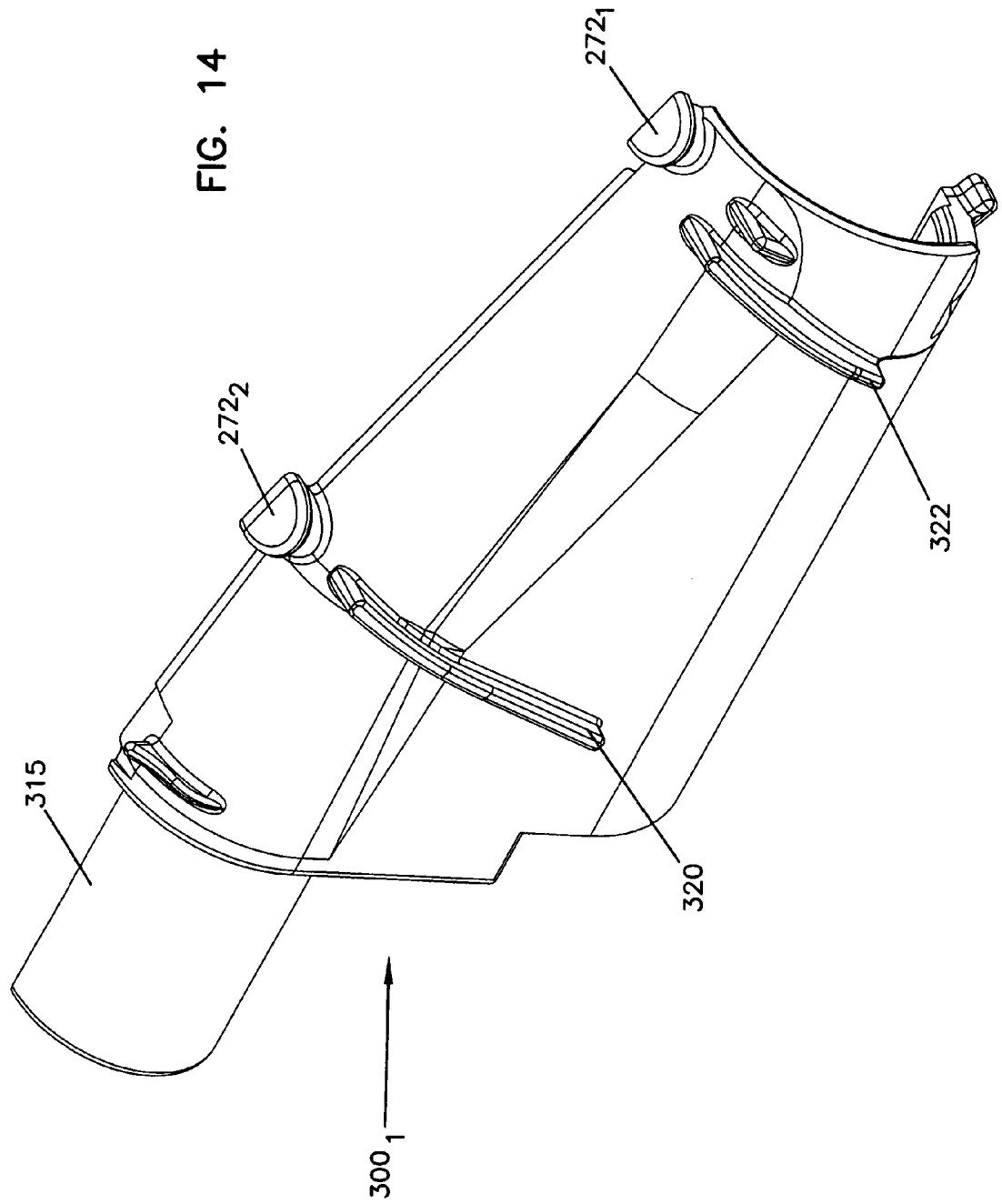
FIG. 14 is a perspective view showing the front, top, and outside of the first breakout block piece of FIG. 13.
Figure 15:
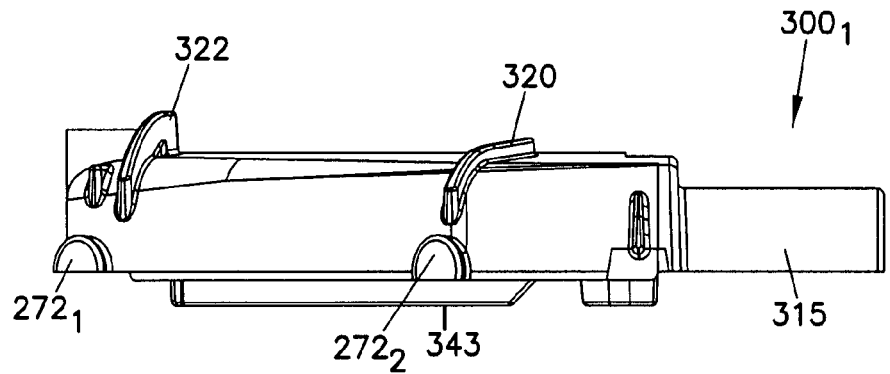
FIG. 15 is a top view of the first breakout block piece of FIG. 13.
Figure 16:
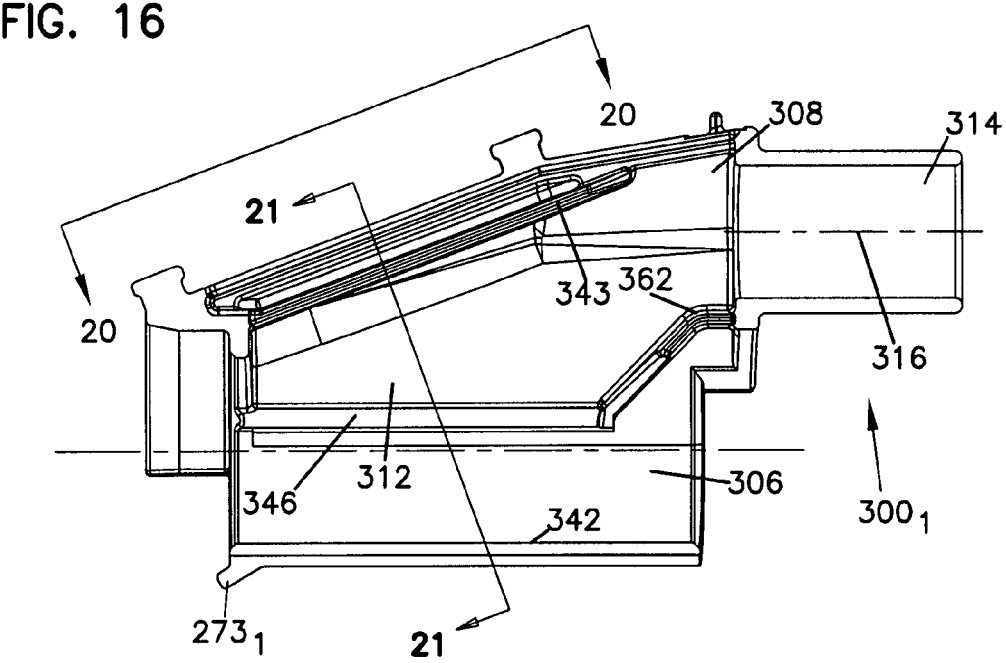
FIG. 16 is a left side (inside) view of the first breakout block piece of FIG. 13.
Figure 17:
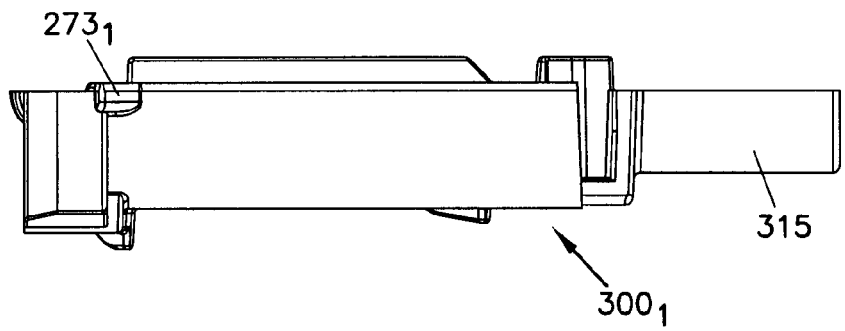
FIG. 17 is a bottom view of the first breakout block piece of FIG. 13.
Figure 18:
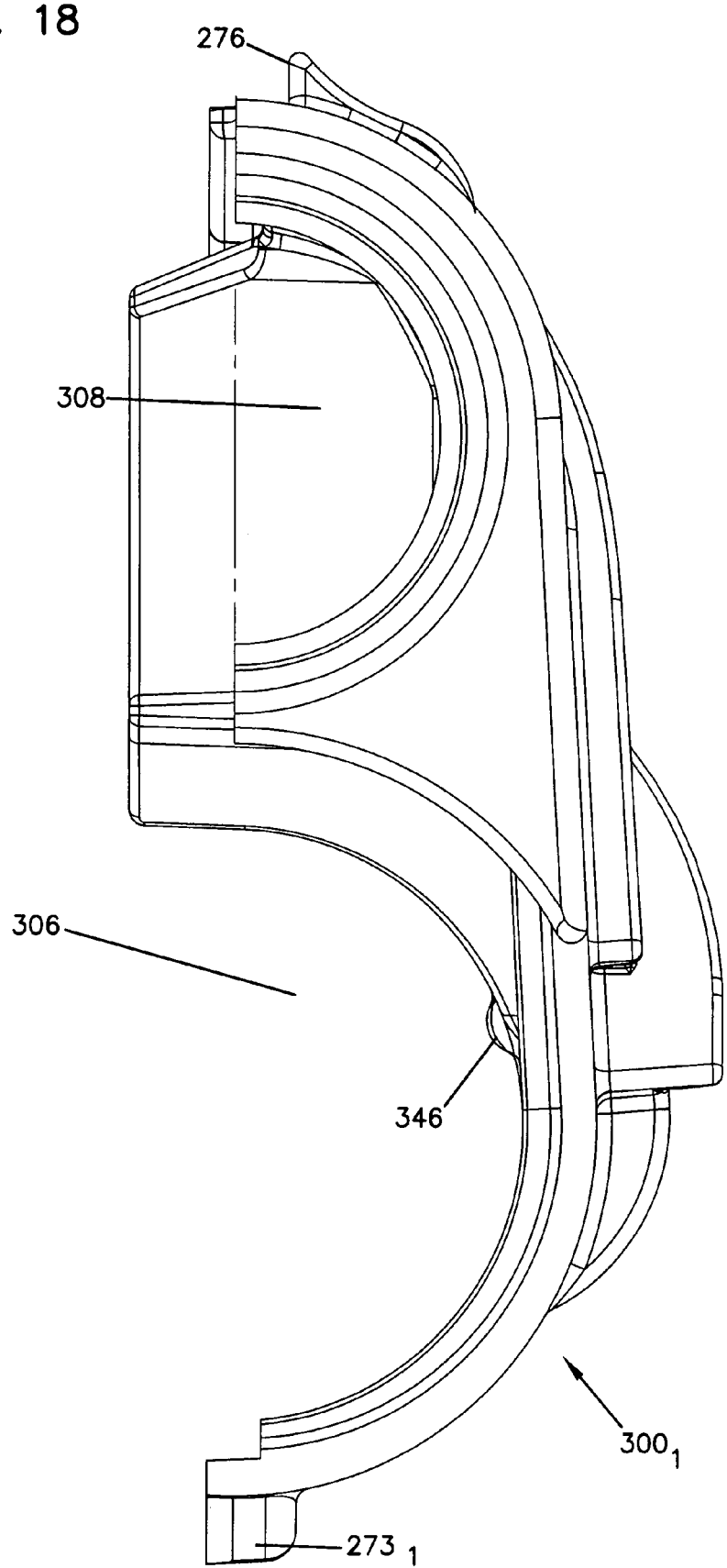
FIG. 18 is a rear view of the first breakout block piece of FIG. 13.
Figure 19:
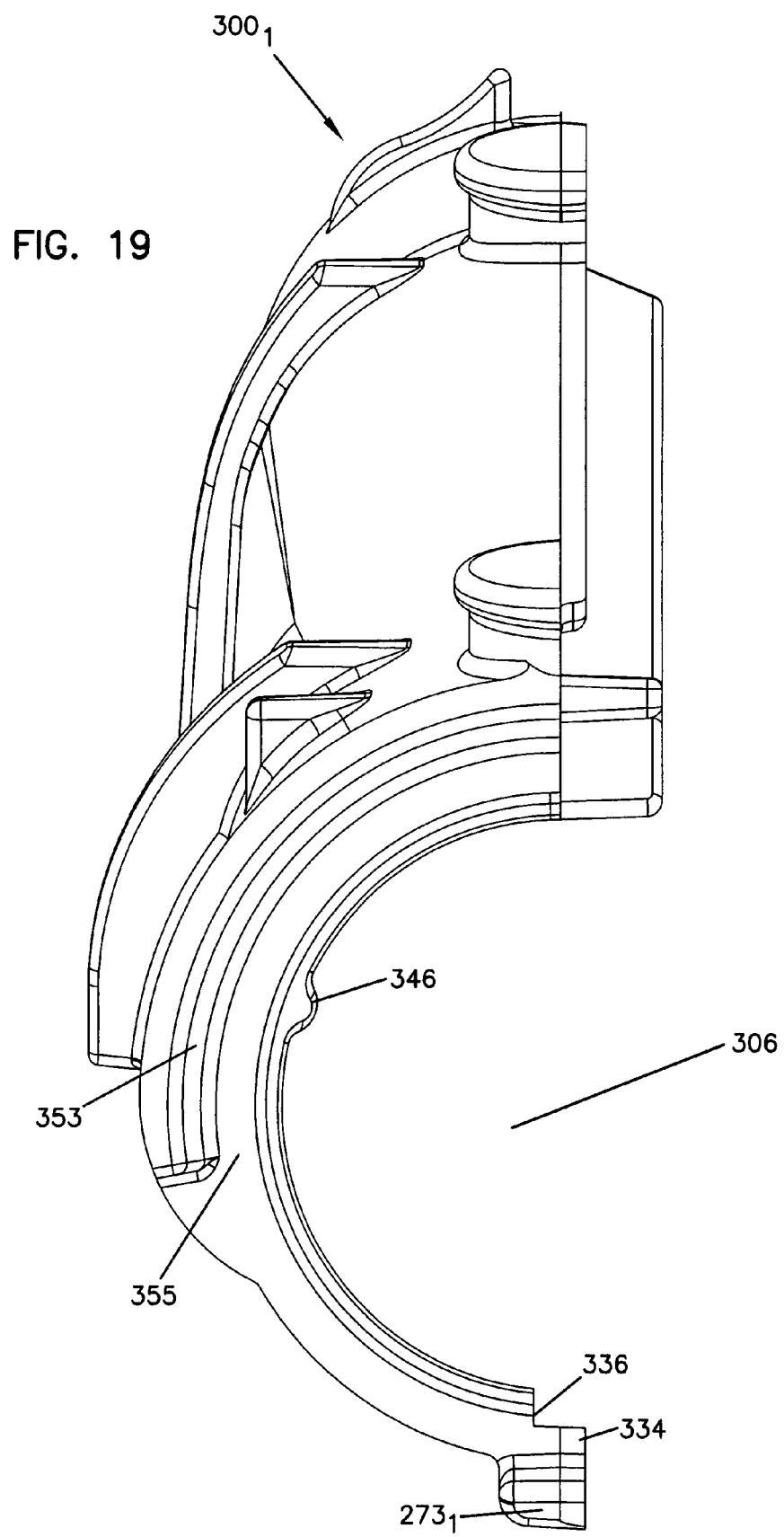
FIG. 19 is a front view of the first breakout block piece of FIG. 13.
Figure 20:
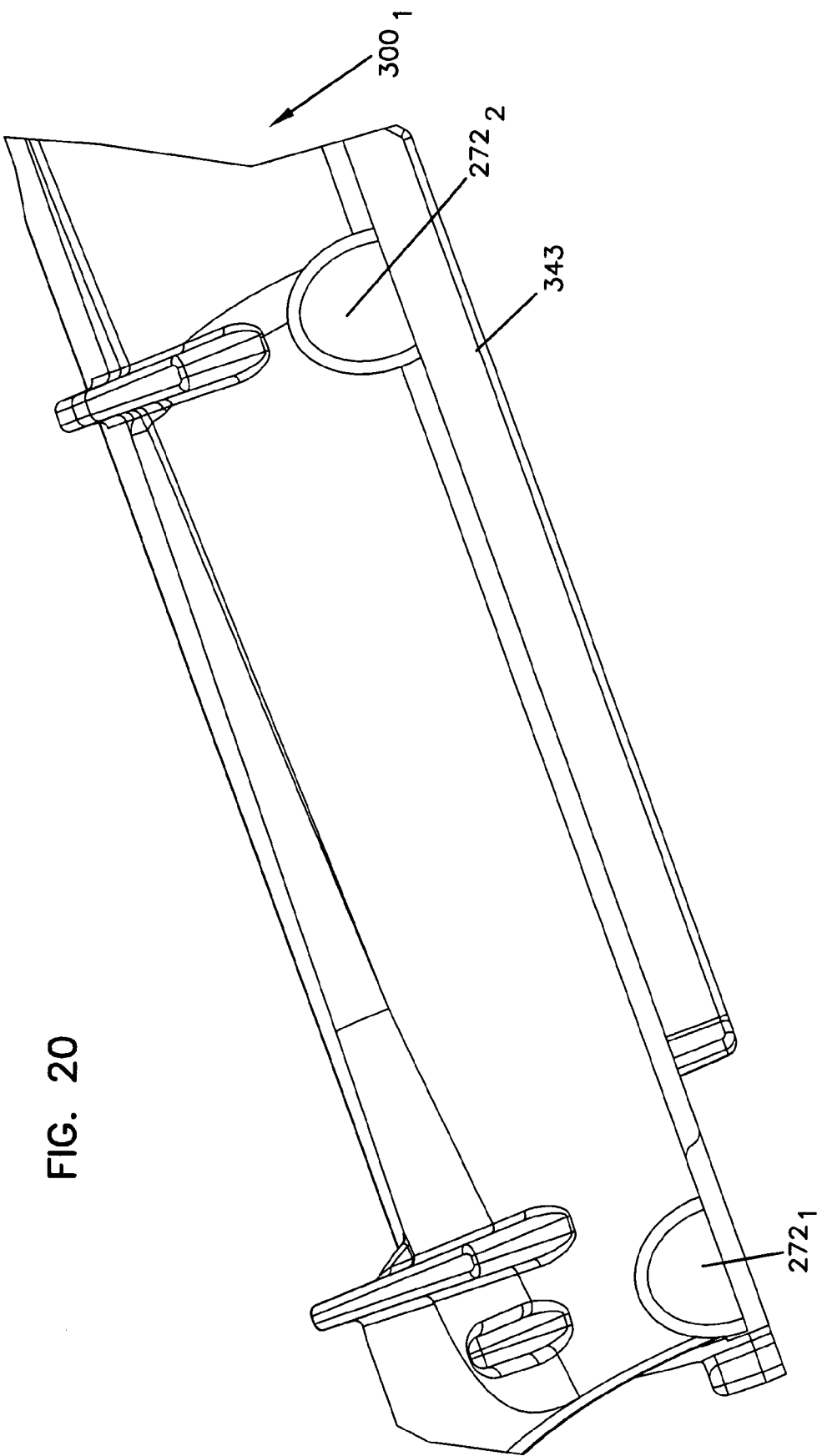
FIG. 20 is a projected view of the first breakout block piece of FIG. 13 taken along projection line 20-20 of FIG. 16.
Figure 21:
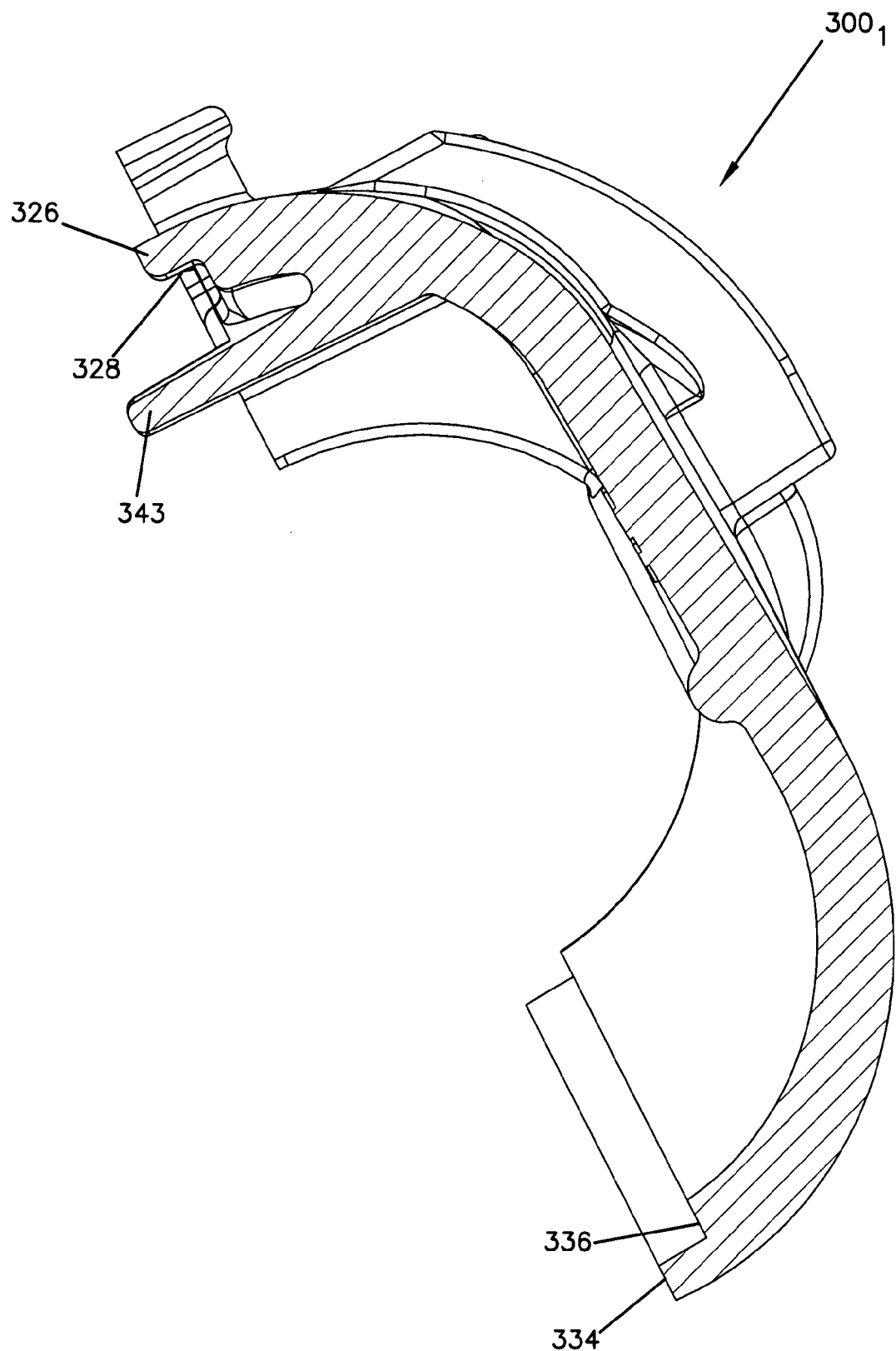
FIG. 21 is a cross-sectional view of the first breakout block piece of FIG. 13 taken along section line 21-21 of FIG. 16.
Figure 22:
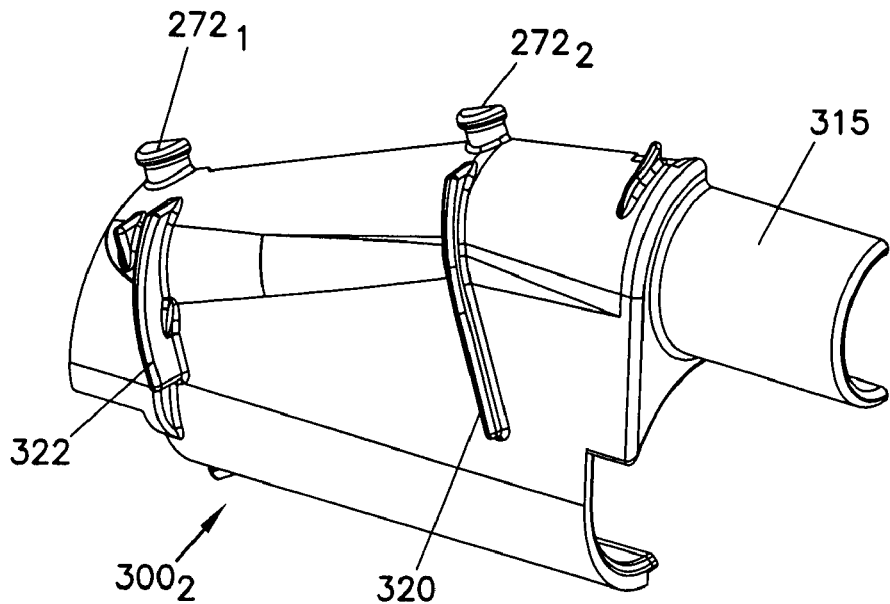
FIG. 22 is a perspective view showing the rear, top, and outside of a second piece of the breakout block of FIG. 7.
Figure 23:
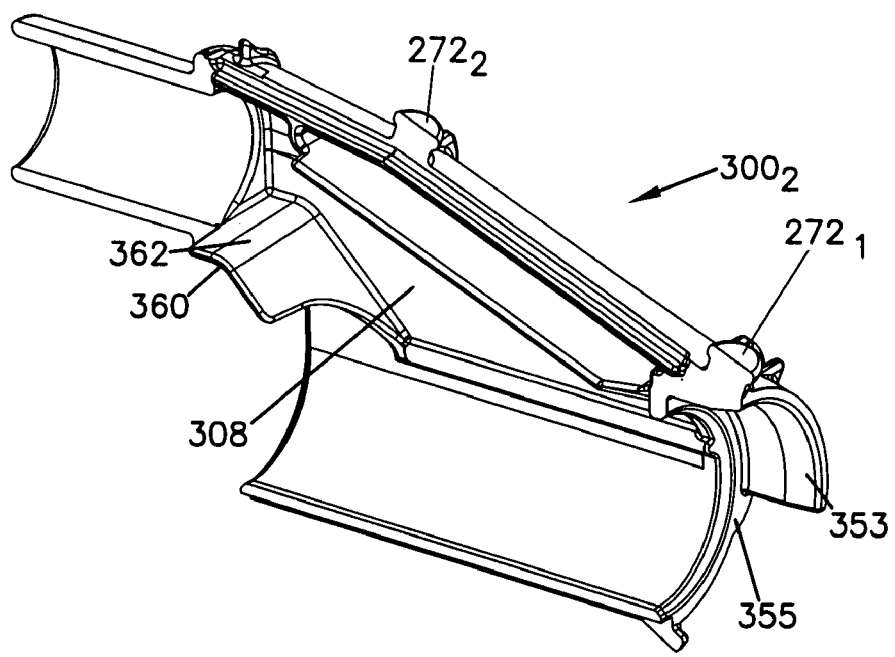
FIG. 23 is a perspective view showing the front, top, and inside of the second breakout block piece of FIG. 22.
Figure 24:
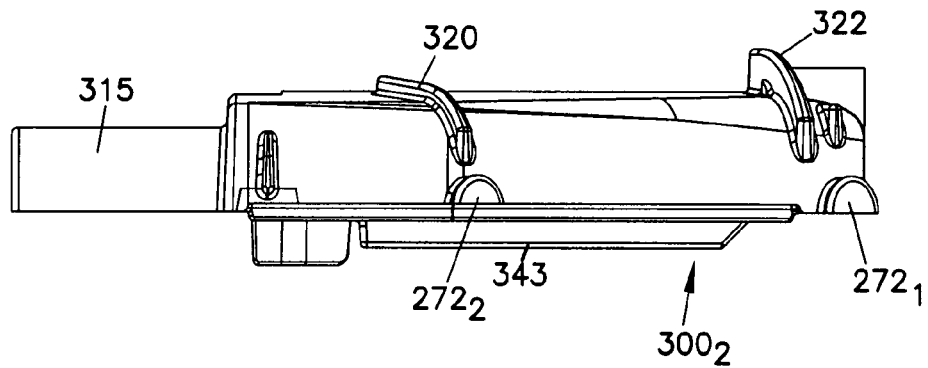
FIG. 24 is a top view of the second breakout block piece of FIG. 22.
Figure 25:
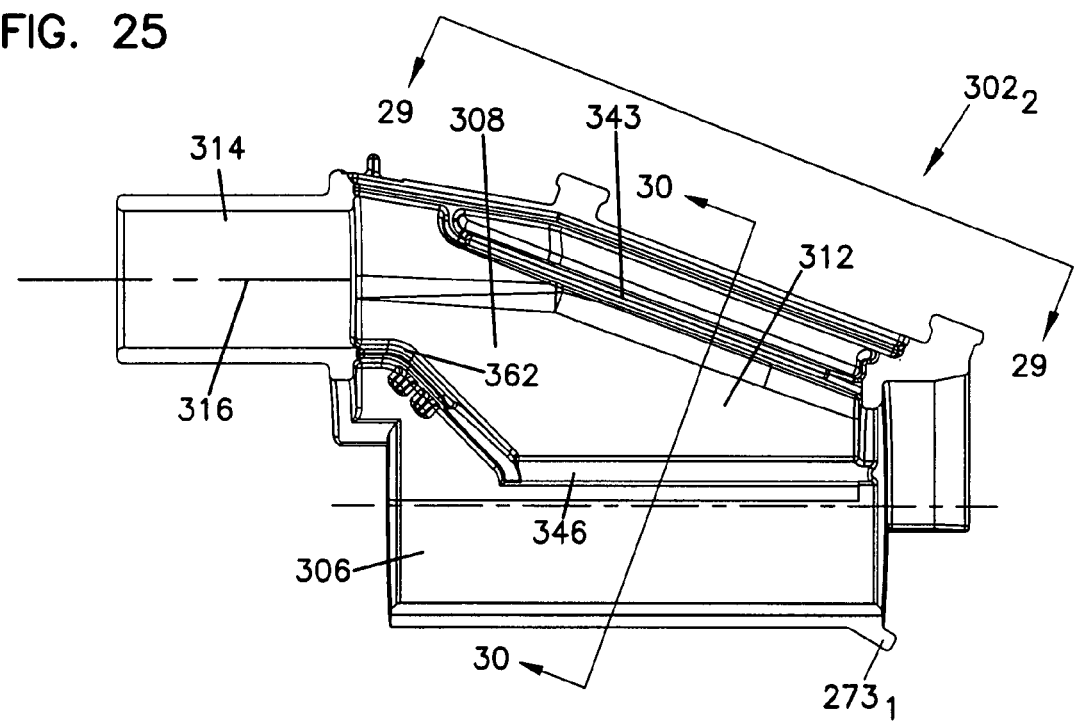
FIG. 25 is a right side (inside) view of the second breakout block piece of FIG. 22.
Figure 26:
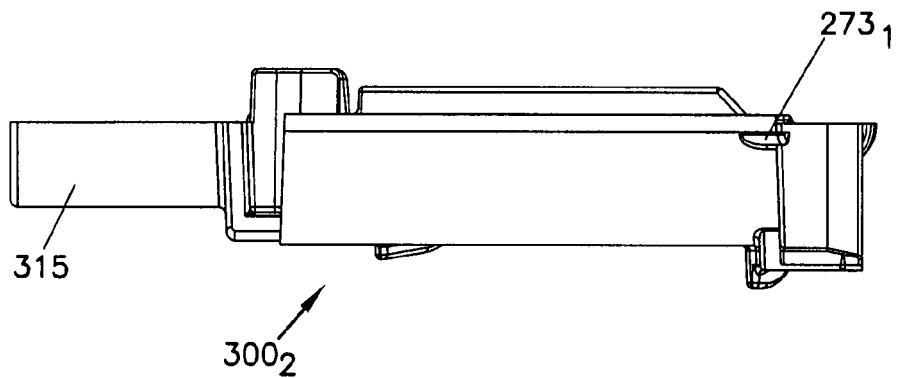
FIG. 26 is a bottom view of the second breakout block piece of FIG. 22.
Figure 27:
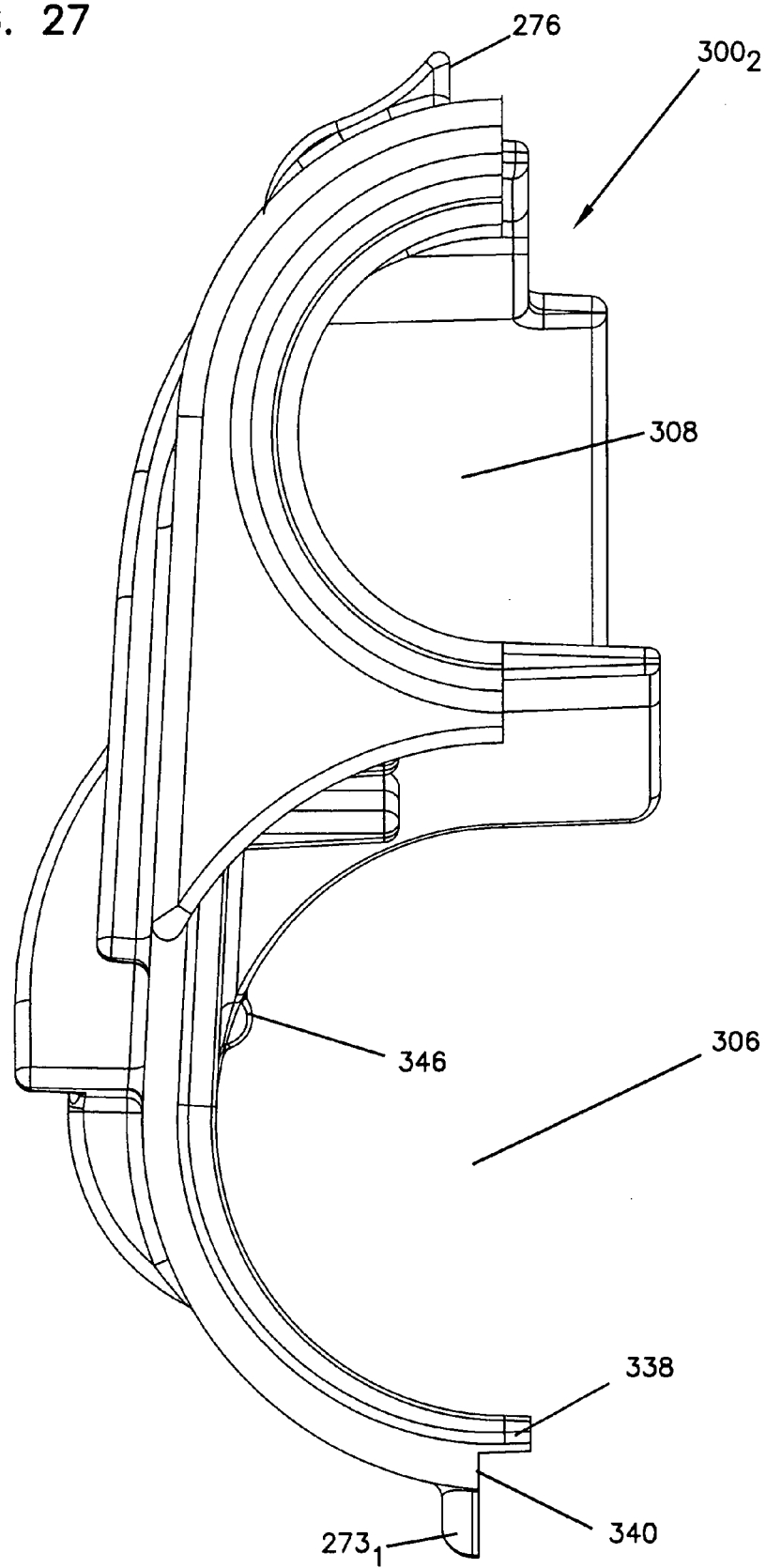
FIG. 27 is a rear view of the second breakout block piece of FIG. 22.
Figure 28:
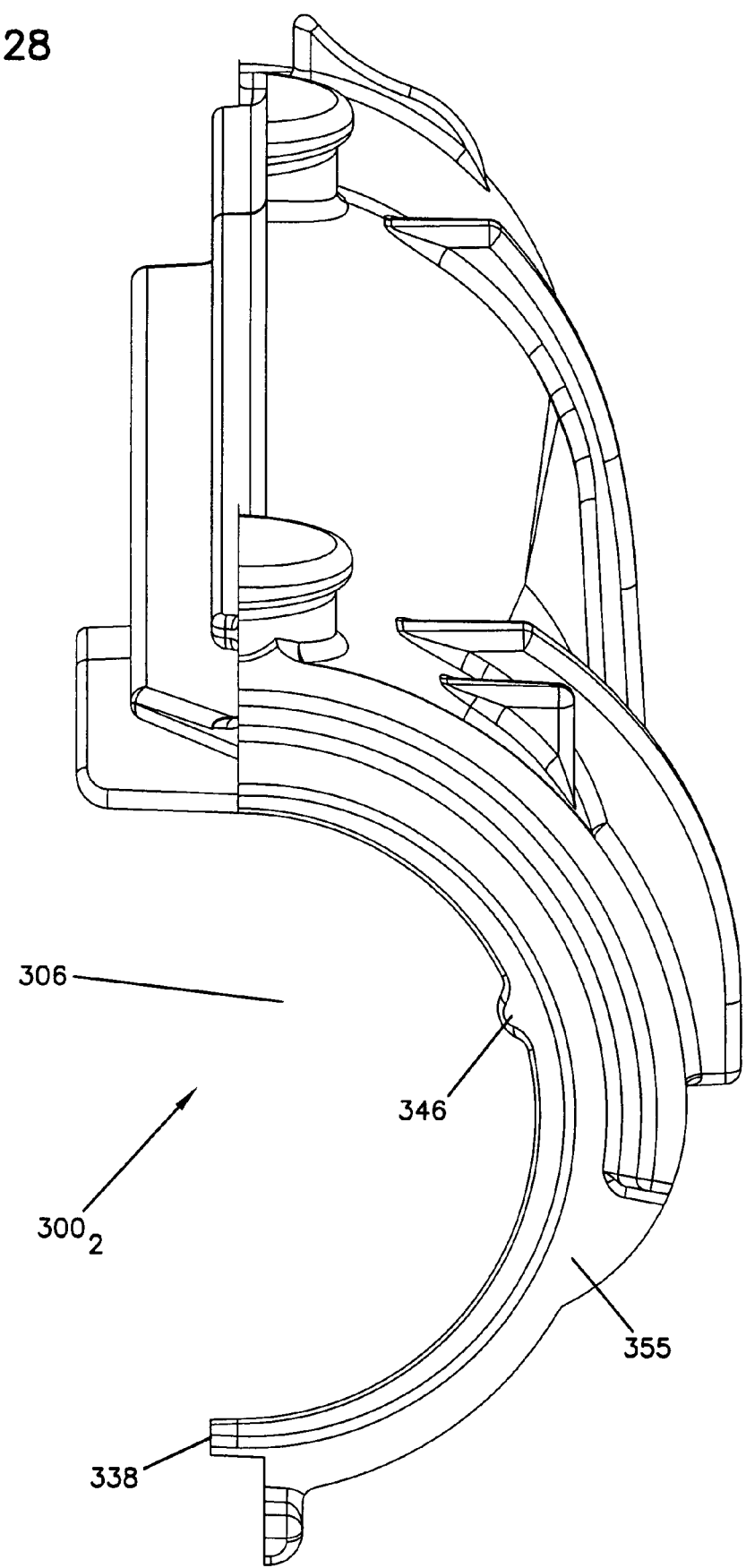
FIG. 28 is a front view of the second breakout block piece of FIG. 22.
Figure 29:
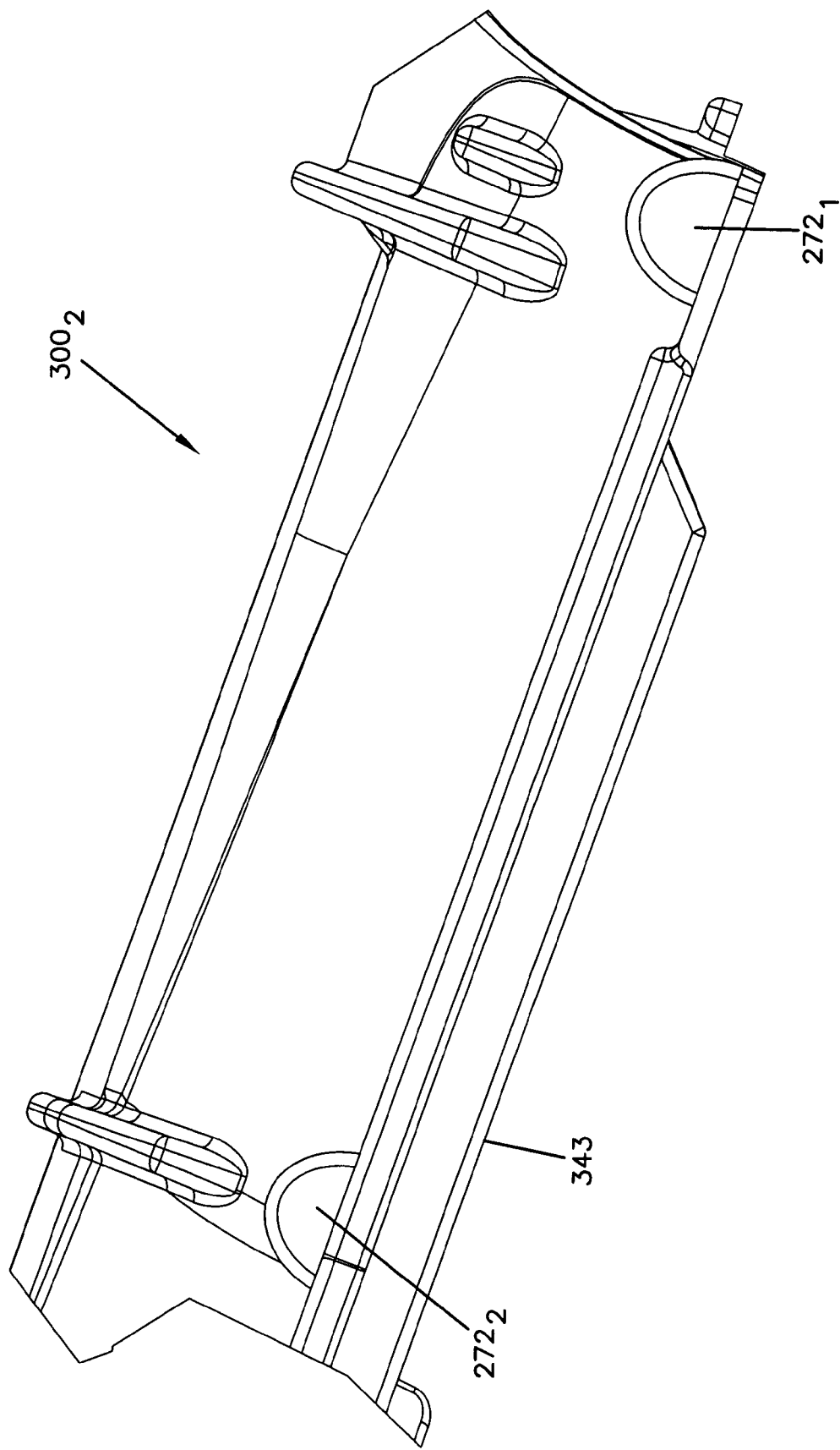
FIG. 29 is a projected view of the second breakout block piece of FIG. 22 taken along projection line 29-29 of FIG. 25.
Figure 30:
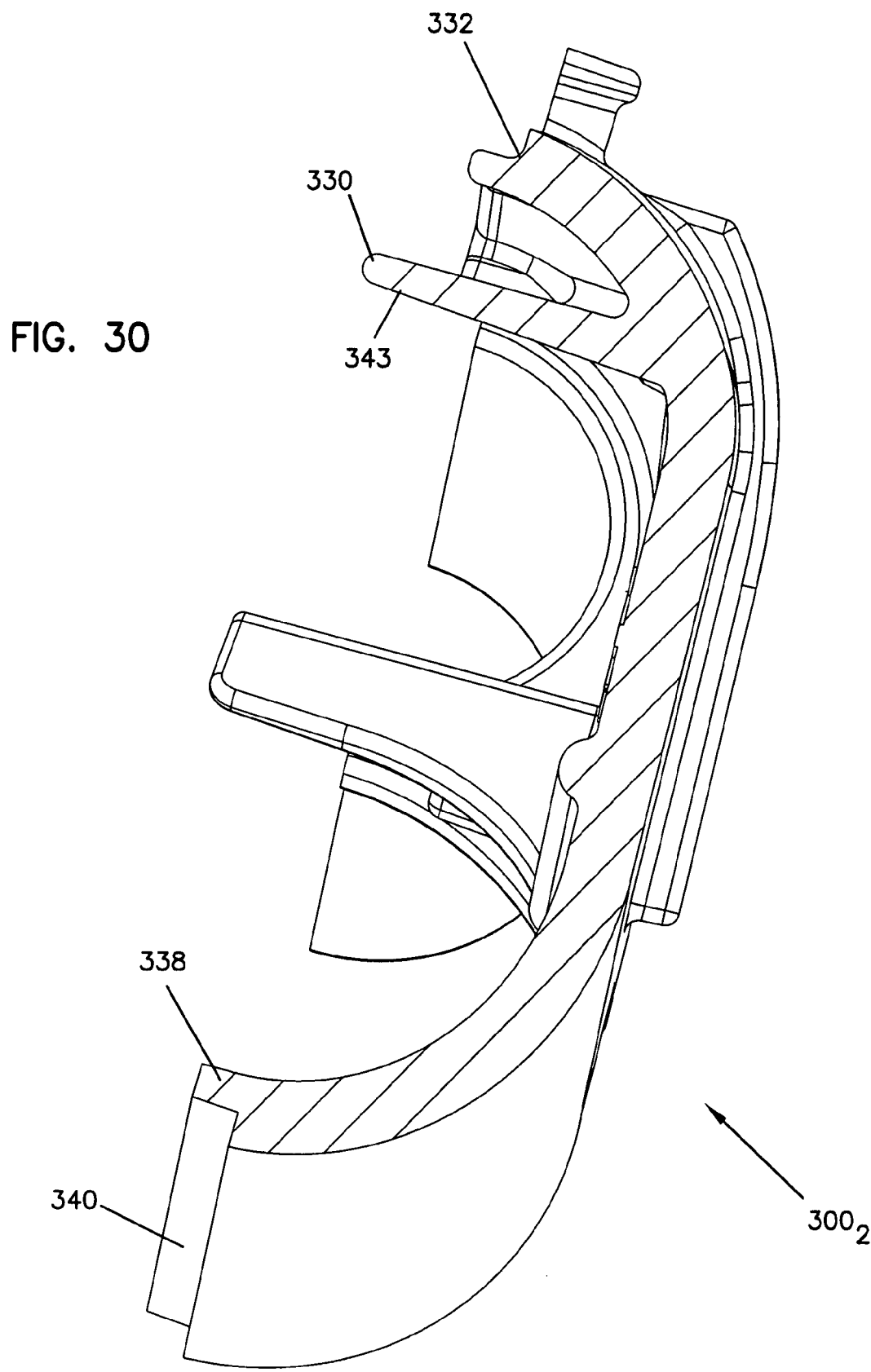
FIG. 30 is a cross-sectional view of the second breakout block piece of FIG. 22 taken along section line 30-30 of FIG. 25.
Figure 31:
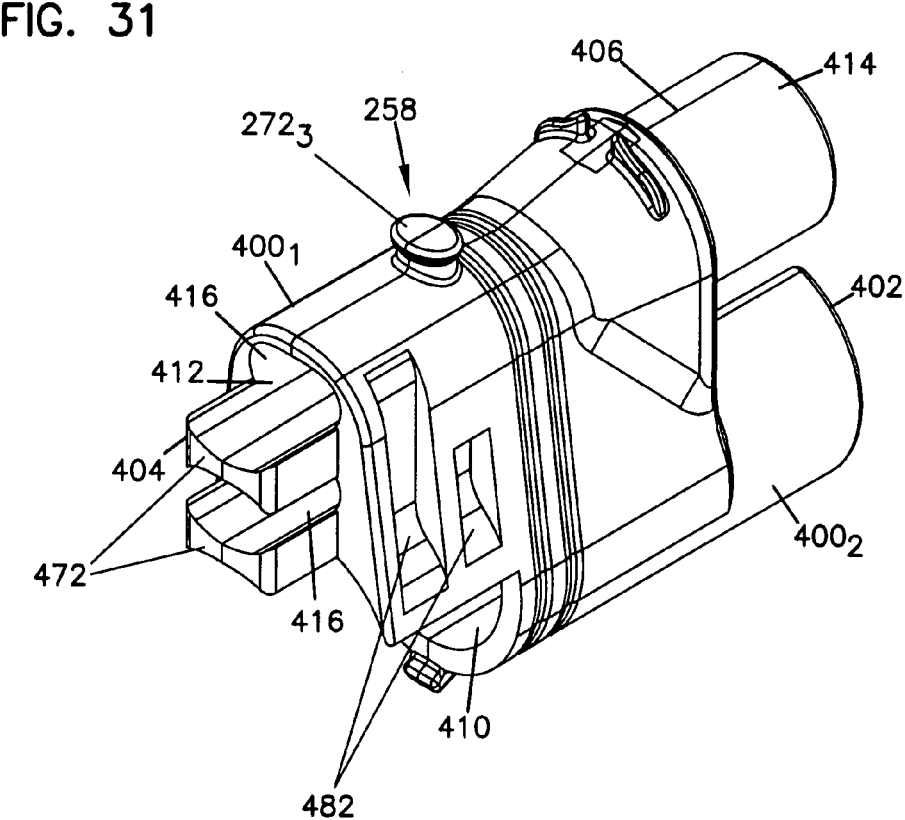
FIG. 31 is a perspective view showing the rear, top, and right side of an example retention block.
Figure 32:
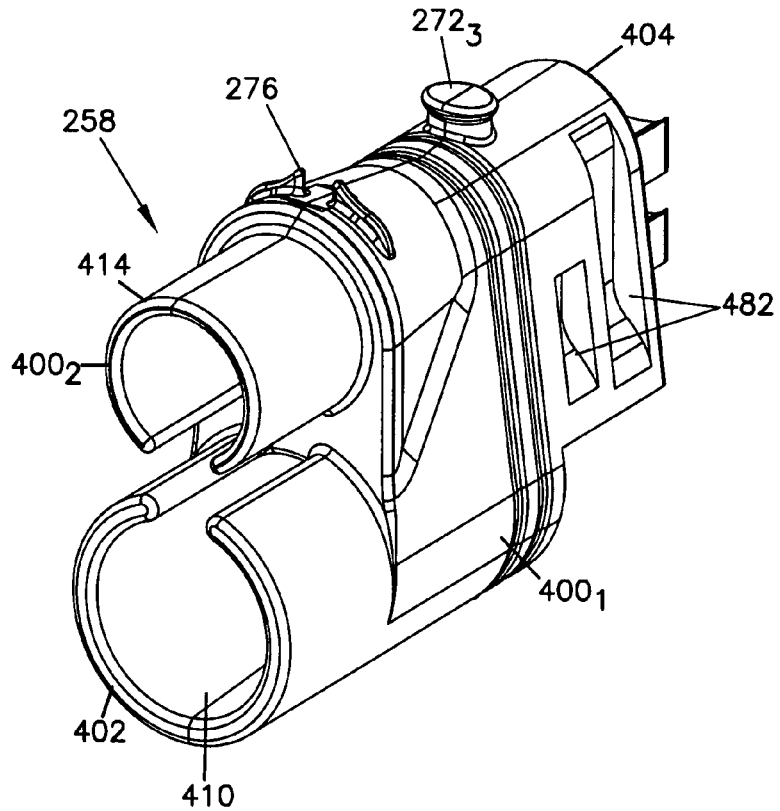
FIG. 32 is a perspective view showing the front, top, and left side of the retention block of FIG. 31.

Referring to FIGS. 13 and 23, the breakout block 254 also includes curved overlap members 360 positioned along the breakout channel 308. The curved overlap members 360 define a curved inner surface 362 that has a curvature designed to prevent the optical fibers $224_{dc}$ from being bent beyond acceptable bend radius requirements. Additionally, the curved overlap members 360 are configured to overlap and nest with one another to assist in maintaining alignment between the first and second pieces $300_1$, $300_2$ of the breakout block when the pieces $300_1$, $300_2$ are inserted together during assembly.

Referring to FIGS. 31-53, the retention block 258 used at the mid-span breakout location 246 includes a first piece $400_1$ (see FIGS. 38-45) that forms a left side of the retention block 258 and a second piece $400_2$ (see FIGS. 46-53) that forms a right side of the retention block 258. The retention block 258 includes a front end 402 positioned opposite from a back end 404. The first and second pieces $400_1$, $400_2$ of the retention block 258 are joined together at upper and lower seams 406, 408 that extend generally from the front end 402 to the rear end 404 of the retention block 258. A bonding material such as epoxy can be used to secure the first and second pieces $400_1$, $400_2$ together at the upper and lower seams 406, 408.

The retention block 258 also includes structure for enhancing the mechanical interlock provided between the retention block 258 and the over-mold 260. For example, groves 482 (shown in FIGS. 31 and 32) project inwardly from opposite sides of the main body of the retention block 258.

Referring still to FIGS. 31-53, the retention block 258 defines a generally cylindrical straight-through passage 410 that extends through the retention block 258 in a direction extending from the front end 402 to the back end 404. The straight-through passage 410 defines an inner diameter sized to correspond with the inner diameter of the outer jacket 230 of the distribution cable 220. When the retention block 258 is mounted on the distribution cable 220, the distribution cable 220 extends through the straight-through passage 410 and is bonded to the straight-through passage 410. The retention block 258 also defines a tether passage arrangement 412 that passes through the retention block 258 in the direction extending from the front end 402 to the back end 404. The tether passage arrangement 412 is adapted for receiving ends of the tethers 244.

Adjacent the front end 402 of the retention block 258, the tether passage arrangement 412 is defined by a generally cylindrical stem 414 that fits within the second end 256 of the protective sleeve 250. At the rear end 404 of the retention block 258, the tether passage arrangement defines two tether receptacles 416. Each tether receptacle 416 includes an outer pocket 418 (see FIGS. 40 and 48) sized to receive a jacketed end of one of the tethers 244. When the tether is mounted within the tether receptacle 416, an end wall 269 (see FIG. 54) of the tether jacket abuts against a rearwardly facing shoulder 420 defined within the tether jacket pocket 418. Shelves 472 project rearward from portions of the tether jacket pocket 418 to further support the tethers 244. Adjacent the tether jacket pockets 418, the tether passage arrangement 412 defines two tether anchor portions 430. Each tether anchor portion 430 includes a central buffer tube receiver 432 and strength member receivers 434 positioned on opposite sides of the central buffer tube receiver 432. Crimp recesses 452 are provided along the tether anchor portions 430 to engage a crimp 282 secured to the tether strength members 264. When the tethers 244 are secured to the retention block 258, the central buffer tubes 262 of the tethers 244 are bonded within the central buffer tube receivers 432 and the strength members 264 of the tethers are bonded (e.g., with epoxy) within the strength member receivers 434. The optical fibers $224_t$ of the tethers 244 are routed through the tether passage arrangement 412 and into the protective sleeve 250 where the optical fibers 224$_t$ are spliced to the optical fibers 224$_{dc}$ of the distribution cable 220.

Figure 56:
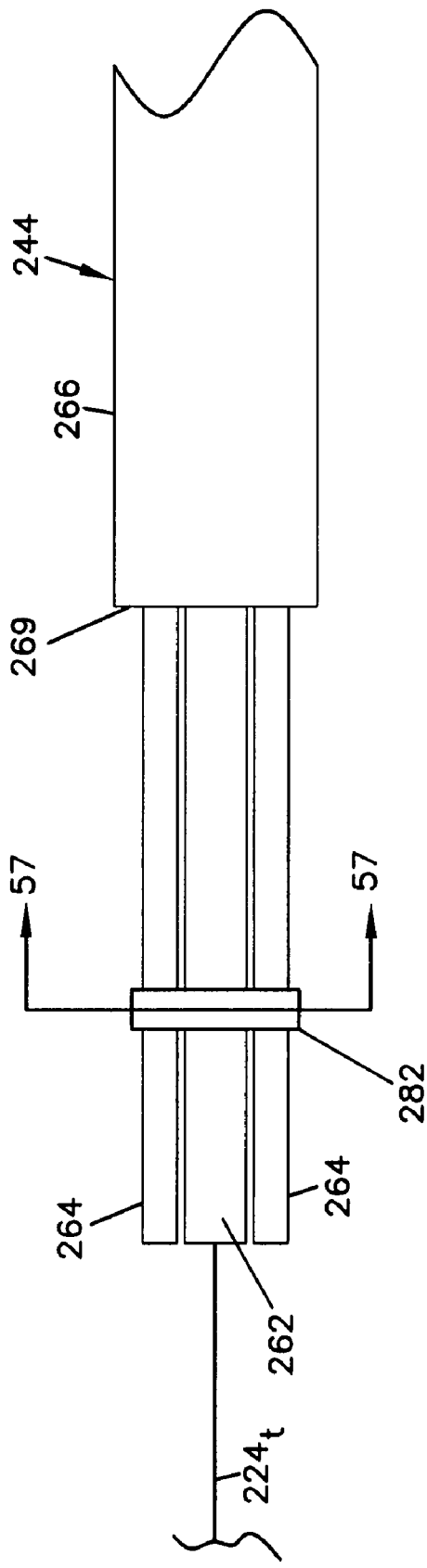
FIG. 56 shows a second preparation step for the tether of FIG. 54.
Figure 57:
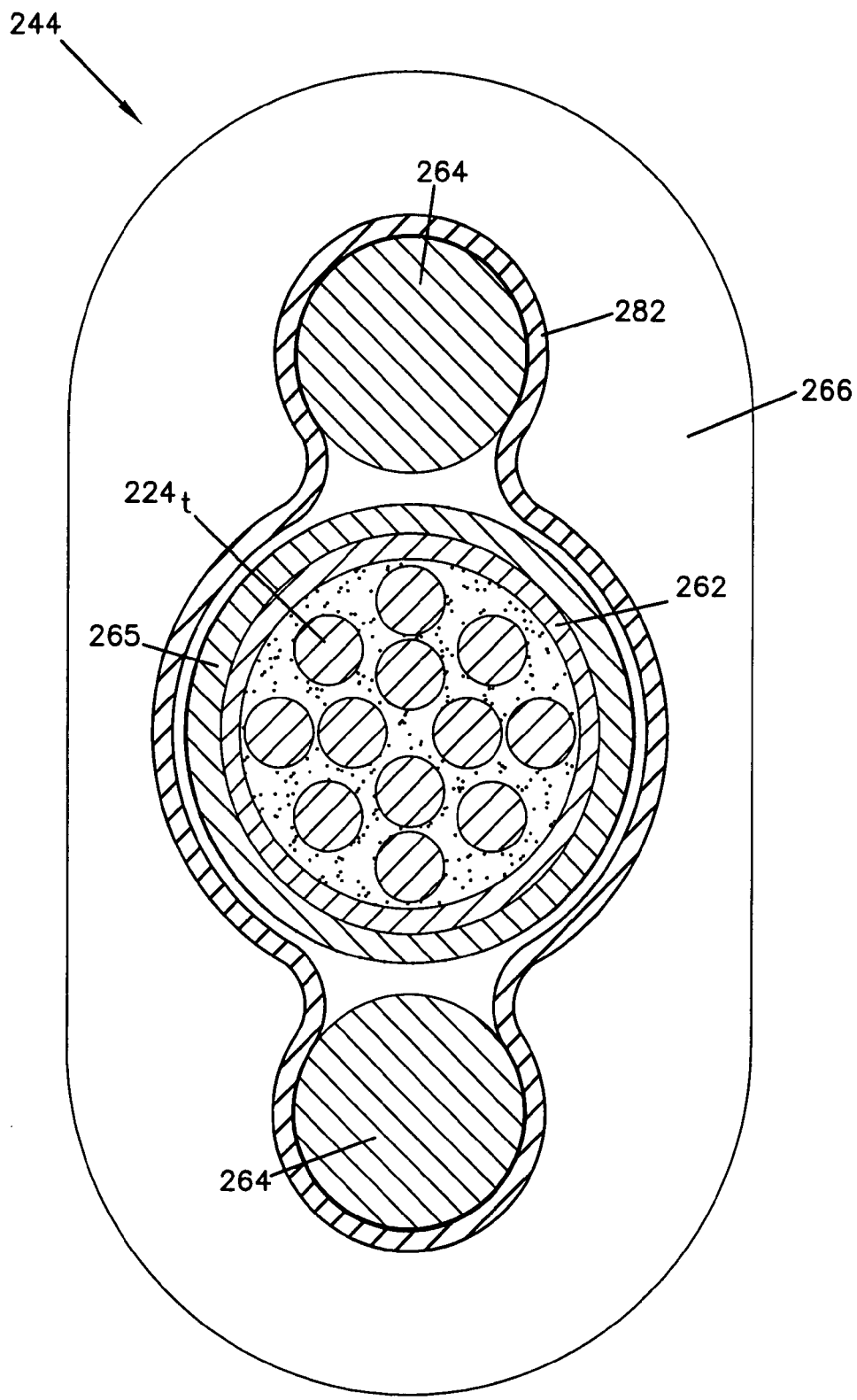
FIG. 57 is an enlarged cross-sectional view of the tether of FIG. 56 taken along section line 57-57 of FIG. 56.
Figure 58:
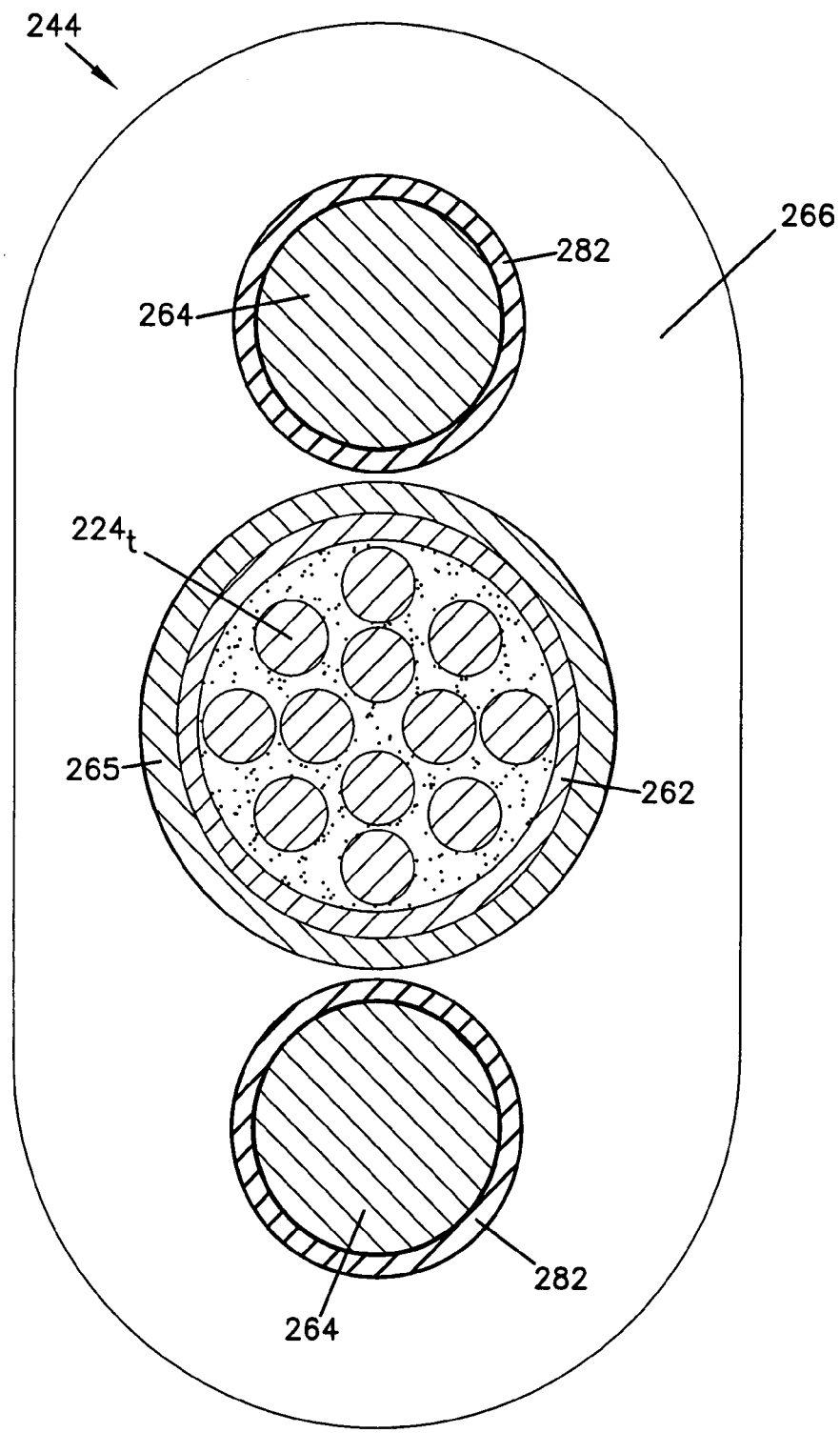
FIG. 58 is a cross-sectional view of an alternate tether similar to that shown in FIG. 57.

To prepare the tethers 244 to be attached to the distribution cable 220 at the mid-span breakout location 246, a portion of the outer jacket 266 of each tether 244 is stripped away to expose the central buffer tube 262 and the strength members 264 (see FIG. 54). As shown at FIG. 54, the central buffer tube 262 and the strength members 264 project outwardly beyond the end 269 of the outer jacket 266. As also shown at FIG. 54, the strength layer 265 has been removed from around the exposed buffer tube 262. After removing the end portion of the outer jacket 266, the strength members 264 are trimmed and an end portion of the central buffer tube 262 is removed to expose the optical fibers 224$_t$. The crimp 282 is then secured to the tether strength members 264 as shown in FIGS. 56 and 57. The crimp 282 can be secured to both strength members 264, or separate crimps 282 can each be secured to each strength member 264 as shown in FIG. 58. A crimp tool may be used to secure the crimp 282 to the strength member 264 providing an accurate and consistent attachment location. The crimp 282 engages the crimp recess 452 of the retention block 258 thereby securing the tether 244. The accurate and repeatable location of the crimp 282 may be used to facilitate an accurate and repeatable assembly process.

To prepare the mid-span breakout location on the distribution cable 220, a portion of the outer jacket 230 is first ring cut and stripped away (see FIG. 55) to provide a stripped region 500 having an upstream end 502 and a downstream end 504. The outer strength member 228 can also be displaced (e.g., bunched at the bottom side of the cable) adjacent the ends 502, 504 to facilitate accessing the buffer tubes 222. One of the buffer tubes 222 is then selected and a first window 508 is cut into the buffer tube adjacent the upstream end 502 of the stripped region 500 and a second window 510 is cut into the buffer tube 222 adjacent the downstream end 504 of the stripped region 500. The optical fibers 224$_{dc}$ desired to be broken out are then accessed and severed at the second window 510. After the optical fibers 224$_{dc}$ have been severed, the optical fibers 224$_{dc}$ are pulled from the buffer tube 222 through the first window 508 (see FIG. 55). With the distribution cable 220 prepared as shown in FIG. 55, the optical fibers 224$_{dc}$ are ready to be terminated to the prepared tether 244 of FIG. 54.

To connect the tethers 244 to the distribution cable 220 at the mid-span breakout location 246, the protective sleeve 250 is first slid over the exterior of the pre-prepared tethers 244. The splice sleeves 248 can also be slid over the optical fibers 224$_t$ of each of the tethers 244. A polymeric binder or resin is then applied to the ends of the exposed optical fibers 224$_{dc}$, 224$_t$ to encase and ribbonize the ends of the optical fibers 224$_{dc}$, 224$_t$. The ribbonized ends of the optical fibers 224$_{dc}$, 224$_t$ are then fusion spliced together. After the fusion splice has been completed, the splice sleeves 248 are slid over the fusion splices to protect the splice locations 245.

Once the optical fibers 224$_{dc}$, 224$_t$ have been fused together, the breakout block 254 is mounted to the distribution cable 220. For example, a bonding material can be applied to the bottom surface 342 of the straight-through channel 306 and the bonding material can also be applied along the upper and lower seams 302, 304. The first and second pieces 300$_1$, 300$_2$ of the breakout block 254 are then mounted over the distribution cable 220 adjacent the upstream end 502 of the stripped region 500. As so positioned, the bottom surface 342 is bonded to the outer strength layer 228 provided at the stripped region of the distribution cable 220. Also, the end 231 of the jacket 230 abuts against the end face 355 provided at the front end of the breakout block 254, and the semi-circular extension 353 at the front end of the breakout block 254 extends over the outer jacket 230. As the first and second pieces 300$_1$, 300$_2$ of the breakout block 254 are mounted over the distribution cable 220, the optical fibers 224$_{dc}$ are positioned to extend through the breakout channel 308 and out the opening 314 of the breakout channel 308. Thereafter, the protective sleeve 250 is slid over the optical fibers 224$_{dc}$, 224$_t$ such that the first end 252 fits over the cylindrical stem 315 provided at the rear end of the breakout block 254.

Next, the retention block 258 is mounted at the downstream end 504 of the stripped region 500. For example, a bonding material can be applied to the upper and lower seams 406, 408, to the interior of the straight-through passage 410, to the central buffer tube receivers 432 and to the strength member receivers 434. The first and second pieces 400$_1$, 400$_2$ of the retention block 258 are then mounted around the distribution cable 220 with the tether optical fibers 224$_t$ extending through the tether passage arrangement 412 and the stripped region 500 of the distribution cable 220 extending through the straight through-channel 410. Also, the central buffer tubes 262 of the tethers 244 are positioned within the central buffer tube receivers 432 and the strength members 264 of the tethers 244 are positioned within the strength member receivers 434. The bonding material provided in the straight-through passage 410 provides a bond between the strength layer 228 of the distribution cable 220 and the retention block 258. The cylindrical stem 414 of the retention block 258 is then inserted into the second end 256 of the protective sleeve 250.

Once the breakout block 254, the retention block 258 and the protective sleeve 250 have been secured to the distribution cable 220, the tensile reinforcing member 270 can be secured to the assembly in the manner previously described. Thereafter, the heat resistant tape 263 can be wrapped about the mid-span breakout location 246. Finally, the over-mold layer 260 is over-molded about the mid-span breakout location 246 to complete the manufacturing process. Thereafter, the distribution cable 220 can be spooled.

It is preferred for the optical fibers 224$_t$ of the tether to be pre-terminated to the optical fibers 224$_{dc}$ of the distribution cable. "Pre-terminated" means that the optical fibers 224$_t$ are fused or otherwise connected to the optical fibers 224$_{dc}$ of the distribution cable 220 at the factory as part of the cable manufacturing process rather than being field terminated. The remainder of the mid-span breakout assembly is also preferably factory installed.

As used herein, with respect to buffer tubes, the term "fiber access location" can be any type of location where a fiber can be routed out of a buffer tube. Example fiber access locations include windows, ring cut regions, or other openings in a buffer tube. Additionally, when the optical fibers 224$_{dc}$, 224$_t$ have been spliced together, the optical fibers 224$_{dc}$, 224$_t$ can collectively be referred to as an optical fiber structure. In such a case, the optical fiber structure includes a first length of optical fiber within the distribution cable, a second length of optical fiber that extends through the breakout location and a third length of optical fiber that extends through the tether. The first, second and third lengths are in optical communication with one another so as to define a signal path that extends from the distribution cable, through the breakout location, to the end of the tether. The term optical fiber structure also includes lengths of optical fibers that do not include intermediate splices. As used herein, the term "breakout portions" of optical fiber include portions of optical fiber that extend along the length of a breakout location.

From the forgoing detailed description, it will be evident that modifications and variations can be made without departing from the spirit or scope of the invention.

What is claimed is:

1. A fiber optic telecommunications cable assembly comprising:
   a main fiber optic cable including a first set of strength members, the first set of strength members including at least one cable strength member continuing along the main fiber optic cable within a radial boundary defined by an inner surface of a cable jacket of the main fiber optic cable;
   a tether cable;
   a breakout block mounted to the main fiber optic cable;
   a retention block mounted to the main fiber optic cable, the tether cable being secured to the retention block;
   a sleeve positioned outside the main fiber optic cable that extends from the breakout block to the retention block;
   an optical fiber structure that extends from the main fiber optic cable, through the breakout block, through the sleeve and through the retention block to the tether cable;
   a tensile reinforcing structure including a second set of strength members, the second set of strength members including at least one tensile reinforcing member that extends solely between the breakout block and the retention block for preventing a spacing between the breakout block and the retention block from exceeding a predetermined amount, the tensile reinforcing structure being radially positioned outside the radial boundary of the main fiber optic cable, and the at least one tensile reinforcing member of the tensile reinforcing structure having a first portion anchored to the breakout block and a second portion anchored to the retention block; and
   an over-mold that covers the breakout block, the sleeve, the retention block, the tensile reinforcing structure and at least a portion of the main fiber optic cable;
   wherein the breakout block includes at least one outwardly projecting securing member for use in securing the at least one tensile reinforcing member of the tensile reinforcing structure to the breakout block; and
   wherein the retention block also includes at least one of the outwardly projecting securing members for use in securing the at least one tensile reinforcing member of the tensile reinforcing structure to the retention block.

2. The fiber optic telecommunications cable assembly of claim 1, wherein the at least one tensile reinforcing member of the tensile reinforcing structure has a string-like configuration.

3. The fiber optic telecommunications cable assembly of claim 1,
   wherein the at least one tensile reinforcing member of the tensile reinforcing structure includes aramid yarn.

4. The fiber optic telecommunications cable assembly of claim 1, wherein the first and the second portions of the at least one tensile reinforcing member of the tensile reinforcing structure are also anchored to the breakout block and the retention block by being wrapped around the breakout block and the retention block respectively.

5. The fiber optic telecommunications cable assembly of claim 1, wherein the at least one tensile reinforcing member of the tensile reinforcing structure includes a first tensile reinforcing length positioned at a first side of the main fiber optic cable and a second tensile reinforcing length positioned at a second side of the main fiber optic cable, the first side of the main fiber optic cable being opposite from the second side of the main fiber optic cable.

6. The fiber optic telecommunications cable assembly of claim 5, wherein the first and second tensile reinforcing lengths are generally parallel to the main fiber optic cable.

7. The fiber optic telecommunications cable assembly of claim 5, wherein the first and second tensile reinforcing lengths are part of a continuous length of the tensile reinforcing member.

8. The fiber optic telecommunications cable assembly of claim 7,
   wherein the tensile reinforcing member includes aramid yarn.

9. The fiber optic telecommunications cable assembly of claim 1, wherein the at least one tensile reinforcing member of the tensile reinforcing structure is wrapped about the securing members.

10. The fiber optic telecommunications cable assembly of claim 1, wherein the at least one tensile reinforcing member of the tensile reinforcing structure is tied to the securing members.

11. The fiber optic telecommunications cable assembly of claim 1, wherein the securing members include posts.

12. The fiber optic telecommunications cable assembly of claim 11, wherein the breakout block includes at least two posts.

13. The fiber optic telecommunications cable assembly of claim 11, wherein the posts are centered along a plane that bisects the breakout block and also bisects the retention block.

14. The fiber optic telecommunications cable assembly of claim 1, wherein the breakout block includes at least two securing members positioned at a first side of the breakout block and at least one securing member positioned at an opposite second side of the breakout block.

15. A fiber optic telecommunications cable assembly comprising:
   a main fiber optic cable including a first set of strength members, the first set of strength members including at least one cable strength member continuing along the main fiber optic cable within a boundary defined by an outer surface of a cable jacket of the main fiber optic cable prior to stripping away the cable jacket at a stripped region;
   a tether cable;
   a breakout piece mounted to the main fiber optic cable, the breakout piece including at least one outwardly projecting securing member;
   a retention piece mounted to the main fiber optic cable, the tether cable being secured to the retention piece, the retention piece also including at least one of the outwardly projecting securing members;
   an optical fiber structure that extends from the main fiber optic cable, through the breakout piece and the retention piece to the tether cable;
   a second set of strength members including a string-like tensile reinforcing member that extends between the breakout piece and the retention piece, the tensile reinforcing member not being a part of the main fiber optic cable and including at least a portion positioned outside the boundary defined by the outer surface of the cable jacket of the main fiber optic cable, and the tensile reinforcing member having portions anchored to the at least one of the outwardly projecting securing members of the breakout piece and the at least one of the outwardly projecting securing members of the retention piece; and
   an over-mold that covers the breakout piece, the retention piece, the tensile reinforcing member and at least a portion of the main fiber optic cable.

16. The fiber optic telecommunications cable assembly of claim 15, wherein the tensile reinforcing member includes aramid yarn.

17. The fiber optic telecommunications cable assembly of claim 1, wherein the at least one cable strength member of the first set of strength members of the main fiber optic cable is a central strength member.

18. The fiber optic telecommunications cable assembly of claim 1, wherein the first set of strength members of the main fiber optic cable is configured as a strength layer.

19. The fiber optic telecommunications cable assembly of claim 1, wherein the second set of strength members of the tensile reinforcing structure is bonded to at least one of the breakout block or the retention block.

20. The fiber optic telecommunications cable assembly of claim 15, wherein the at least one cable strength member of the first set of strength members of the main fiber optic cable is a central strength member.

21. The fiber optic telecommunications cable assembly of claim 15, wherein the string-like tensile reinforcing member is bonded to at least one of the breakout piece or the retention piece.

22. A fiber optic telecommunications cable assembly comprising:
 a main fiber optic cable having a central axis and an outer jacket, the main fiber optic cable defining a first radial dimension that extends from the central axis to an outer surface of the outer jacket;
 a tether cable;
 a breakout block mounted to the main fiber optic cable, the breakout block including at least one outwardly projecting securing member;
 a retention block mounted to the main fiber optic cable, the tether cable being secured to the retention block, the retention block also including at least one of the outwardly projecting securing members;
 a sleeve positioned outside the main fiber optic cable that extends from the breakout block to the retention block;
 an optical fiber structure that extends from the main fiber optic cable, through the breakout block, through the sleeve and through the retention block to the tether cable;
 a tensile reinforcing member that extends from the breakout block to the retention block for preventing a spacing between the breakout block and the retention block from exceeding a predetermined amount, the tensile reinforcing member being positioned outside the main fiber optic cable and being spaced from the central axis of the main fiber optic cable by a second radial dimension that is larger in magnitude than the first radial dimension, the tensile reinforcing member having portions anchored to the at least one outwardly projecting securing members of the breakout block and the retention block; and an over-mold that covers the breakout block, the sleeve, the retention block, the tensile reinforcing member and at least a portion of the main fiber optic cable.

23. The fiber optic telecommunications cable assembly of claim 22, wherein the tensile reinforcing member is a string-like member.

24. The fiber optic telecommunications cable assembly of claim 22, wherein the tensile reinforcing member is a string.

25. The fiber optic telecommunications cable assembly of claim 22, wherein the tensile reinforcing member includes aramid yarn.

* * * * *